(12) United States Patent
Haines

(10) Patent No.: US 10,746,332 B1
(45) Date of Patent: Aug. 18, 2020

(54) ADJUSTABLE PIPE COUPLING

(71) Applicant: Roger C. Haines, Branson, MO (US)

(72) Inventor: Roger C. Haines, Branson, MO (US)

( * ) Notice: Subject to any disclaimer, the term of this patent is extended or adjusted under 35 U.S.C. 154(b) by 370 days.

(21) Appl. No.: 15/697,718

(22) Filed: Sep. 7, 2017

Related U.S. Application Data

(63) Continuation-in-part of application No. 14/039,990, filed on Sep. 27, 2013, now abandoned.

(60) Provisional application No. 61/744,470, filed on Sep. 27, 2012, provisional application No. 61/862,203, filed on Aug. 5, 2013, provisional application No. 62/384,373, filed on Sep. 7, 2016.

(51) Int. Cl.
*F16L 27/02* (2006.01)
*F16L 27/08* (2006.01)

(52) U.S. Cl.
CPC .......... *F16L 27/02* (2013.01); *F16L 27/0841* (2013.01); *F16L 27/0849* (2013.01)

(58) Field of Classification Search
CPC ....... F16L 27/02; F16L 27/04; F16L 27/0841; F16L 27/0849
USPC .................................................. 285/181, 184
See application file for complete search history.

(56) References Cited

U.S. PATENT DOCUMENTS

| | | | |
|---|---|---|---|
| 783,987 A | 2/1905 | Walsh | 123/189 |
| 795,564 A | 7/1905 | Turner | 285/138.1 |
| 1,568,649 A | 1/1926 | Woodruff | 285/106 |
| 1,779,936 A | 10/1930 | Hess | 285/263 |
| 1,884,944 A | 10/1932 | Williams | 285/11 |
| 2,190,532 A | 2/1940 | Lukomski | 210/164 |
| 2,546,442 A | 3/1951 | Guy | 285/261 |
| 2,937,895 A | 5/1960 | Langen et al. | 403/130 |
| 3,276,796 A | 10/1966 | Daniel | 285/261 |
| 3,361,450 A | 1/1968 | Franck | 285/271 |
| 4,163,571 A | 8/1979 | Nash | 285/106 |
| 4,704,043 A | 11/1987 | Hackman et al. | 403/56 |
| 4,879,771 A | 11/1989 | Piskula | 4/256.1 |
| 5,290,075 A | 3/1994 | Allread | 285/261 |
| 5,658,022 A | 8/1997 | Shi et al. | 285/148.23 |
| 6,269,495 B1 | 8/2001 | Sondrup | 4/679 |
| 6,350,373 B1 | 2/2002 | Sondrup | 210/164 |
| 6,381,775 B1 | 5/2002 | Sondrup | 4/679 |
| 6,454,313 B1 | 9/2002 | Dawson, Jr. et al. | 285/261 |
| 6,460,898 B1 | 10/2002 | Chieh | 285/261 |
| 6,561,549 B1 | 5/2003 | Moris | 285/181 |
| 6,595,554 B2 | 7/2003 | Byrnes | 285/179 |
| 6,746,056 B2 | 6/2004 | Palmer | 285/261 |

(Continued)

*Primary Examiner* — Zachary T Dragicevich
(74) *Attorney, Agent, or Firm* — Jonathan A. Bay

(57) ABSTRACT

A ball and socket coupling that avoids threaded tightening-components instead has telescoped components that are bonded together. Such a coupling has a hollow seat-formed link, a counterpart hollow ball-formed link, and a socket-forming collar. Both the links have fitting extensions. The ball-formed link has a spherical bulb at one end as the seat-formed link has a conforming, spherically-widening seat surface at one end. The socket-forming collar has a centrally apertured web with a conforming spherically-narrowing socket surface at one end of an axially elongated sleeve. The coupling is adapted to be assembled and bonded into solid rigidity by workers in the field with the spherical bulb bonded to and clamped between the seat-formed link's spherically-widening seat surface and the collar's spherically-narrowing socket surface. In addition, the collar's elongated sleeve is bonded internally to the seat-an outer sidewall of the seat-formed link's seat-formed end.

9 Claims, 22 Drawing Sheets

(56) References Cited

U.S. PATENT DOCUMENTS

| | | | |
|---|---|---|---|
| 6,846,022 B2 | 1/2005 | Takagi | 285/146.1 |
| 7,188,869 B2 | 3/2007 | Garraffa | 285/261 |
| 7,320,484 B2 | 1/2008 | Wuthrich | 285/184 |
| 7,712,793 B1 | 5/2010 | Garraffa | 285/261 |
| 8,146,954 B2 | 4/2012 | Su | 285/261 |
| 8,196,967 B2 | 6/2012 | Seifert et al. | 285/14 |
| 2007/0246258 A1 | 10/2007 | Magno | 174/651 |

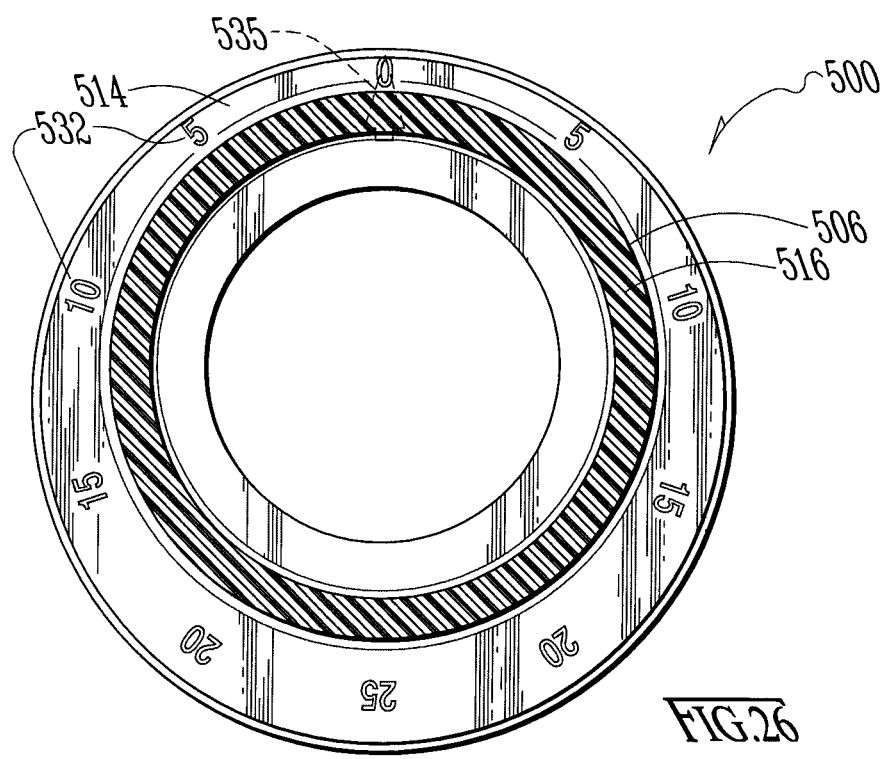

US 10,746,332 B1

ADJUSTABLE PIPE COUPLING

CROSS-REFERENCE TO PROVISIONAL APPLICATION(S)

This application claims the benefit of U.S. Provisional Application No. 62/384,373, filed Sep. 7, 2016.

This application is also a continuation-in-part of U.S. patent application No. 14,039,990, filed Sep. 27, 2013, now abandoned; which claims the benefit of U.S. Provisional Application No. 61/744,470, filed Sep. 27, 2012, as well as U.S. Provisional Application No. 61/862,203, filed Aug. 5, 2013.

The disclosures of the above-identified priority applications are incorporated herein by this reference thereto.

BACKGROUND AND SUMMARY OF THE INVENTION

The invention relates to joints or couplings for fluid-, wire- or cable-conducting pipes or tubes and, more particularly, to coupling that is selectively swivelled by an installer to find level.

Alternatively, the invention relates to joints or couplings for fluid-, wire- or cable-conducting pipes or tubes and, more particularly, to coupling that is selectively swivelled by an installer to set an angle (including without limitation a straight angle).

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 26 is a section view taken in the direction of the arrows XXIV-XXIV in FIG. 25A;

DETAILED DESCRIPTION OF THE
PREFERRED EMBODIMENTS

Figure 3:
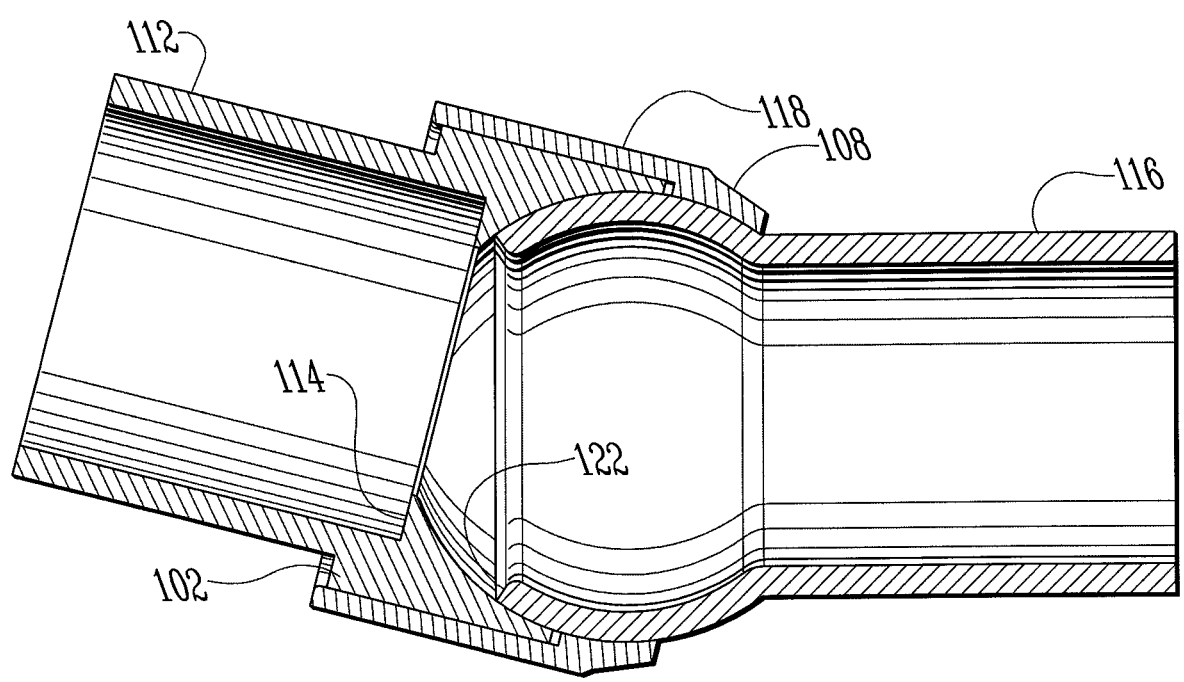
FIG. 3 is an enlarged-scale sectional view of the adjustable pipe coupling of FIG. 2 shown in isolation, wherein the section view cutting plane is taken through an axial plane of symmetry thereof, and the coupling is adjusted to subtend about a 15° angle.
Figure 4:
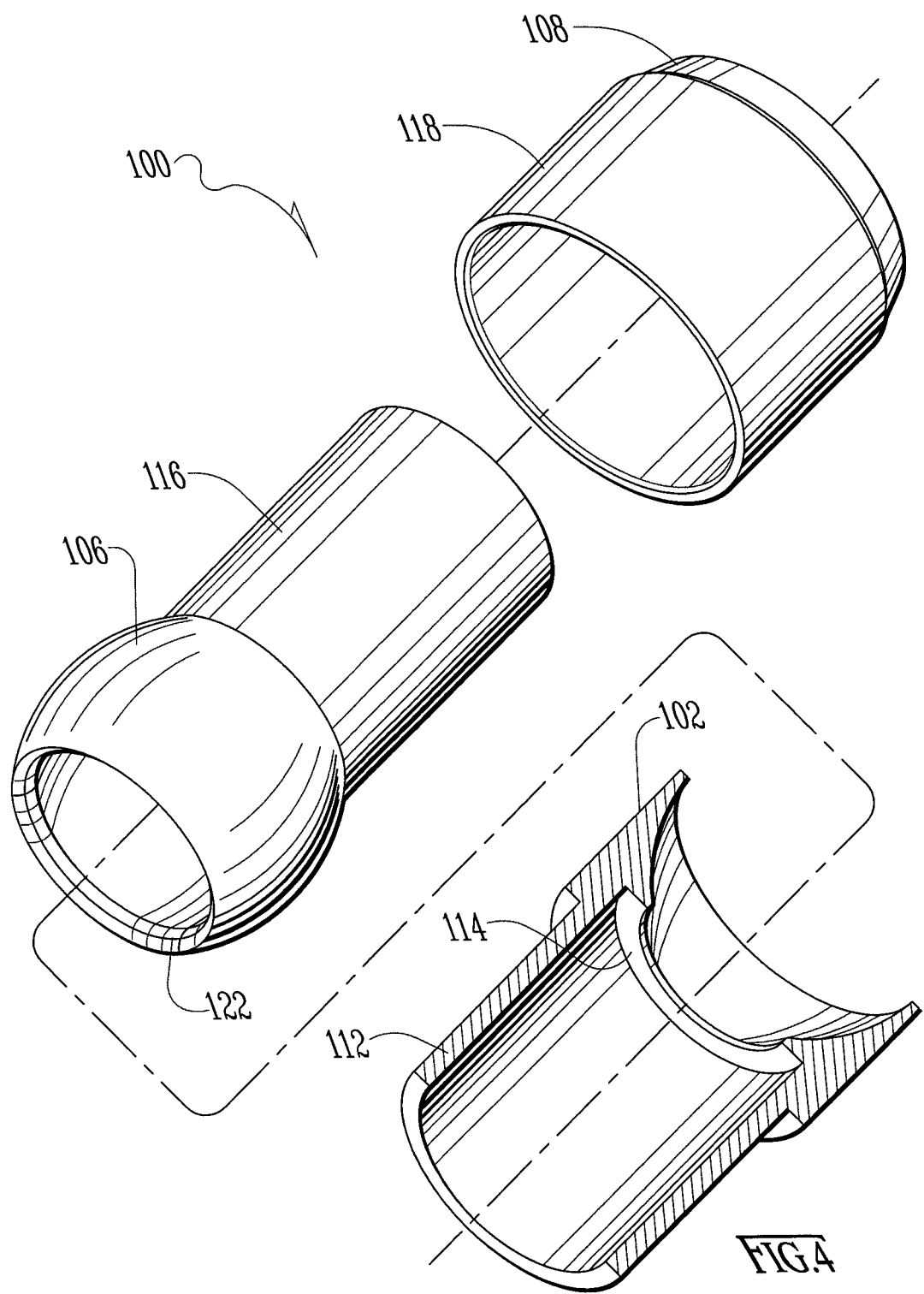
FIG. 4 is an exploded perspective view of FIG. 3, partly in section.

To turn first to FIGS. 3 and 4, these views show better an adjustable pipe coupling 100 in accordance with the invention. The inventive coupling 100 is useful for all kinds of plumbing applications including for fluid-, wire- or cable-conducting pipes or tubes and the like.

The inventive coupling 100 comprises a seat-formed link 102 as well as a counterpart ball-formed link 106, and then also a socket-forming collar 108 therefor.

The seat-formed link 102 comprises a seat-formed end as well as a fitting extension 112 extending axially away from the seat-formed end and through both of which extends a common axial lumen (eg., relatively-symmetric cylindrical hollow core). Preferably but without limitation the fitting extension 112 hereof is configured as a receiver (eg., female fitting) in contrast to an insert (eg., male fitting) for purposes more particularly described below. The fitting extension 112 includes an annular flange 114 that serves as a stop surface for whatever sort of pipe, tube or conduit gets inserted therein.

The ball-formed link 106 comprises a ball-formed end as well as a fitting extension 116 extending axially away from the ball-formed end and through both of which extends a counterpart, common axial lumen (eg., relatively-symmetric cylindrical hollow core). Preferably but without limitation the fitting extension 116 hereof is configured as an insertion fitting in contrast to a receiving fitting for purposes more particularly described below.

The socket-forming collar 108 comprises a centrally-apertured web and a cylindrical sleeve 118 extending axially away from the centrally-apertured web.

It is a design preference that the coupling 100 as a whole—eg., the two links 102, 106 and socket-forming collar 108 therefor—is(are) are all constructed of polyvinyl chloride (PVC) or the like because such is solvent-weldable material. To put this differently, it is a design preference that—once the links 102,106 and collar 108 are assembled on a job site and adjusted, to a custom angle by trial-and-error swivelling to match the needs of a given, particular end-utilization—such a custom adjustment can be "cemented" permanently in place by any suitable solvent, or else glue, cement, any other suitable bonding compound and so on.

The ball-formed link 106's ball-formed end comprises a hollow spherical bulb terminating in an opening rimmed by a beveled edge 122 for purposes more particularly described below. The seat-formed link 102's seat-formed end comprises a conforming, spherically-widening seat surface, as well as an outer sidewall. The socket-forming collar 108's centrally-apertured web comprises a conforming, spherically-narrowing socket surface. The sleeve 118 is sized and arranged for a sliding telescopic-fit over the seat-formed link 102's sidewall of its seat-formed end.

Figure 1:
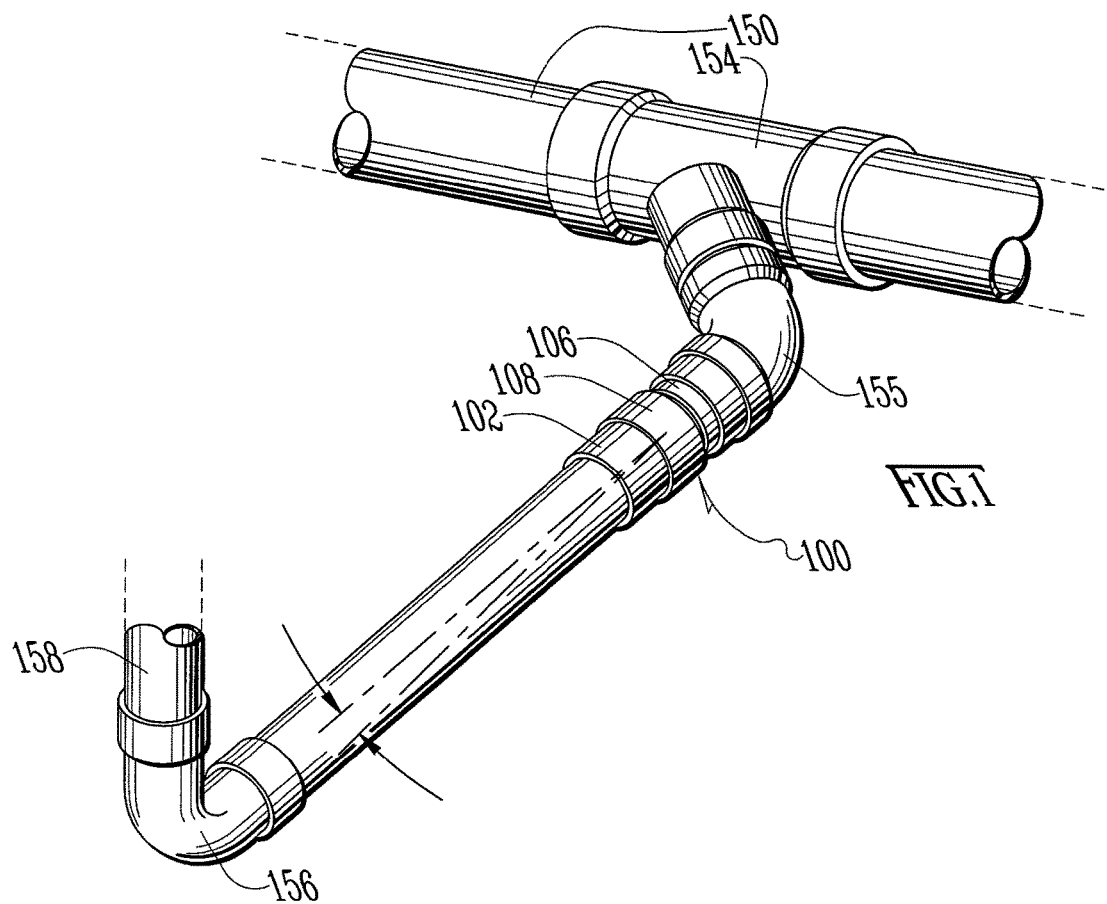
FIG. 1 is a perspective view of a plumbing intersection between a sewage drain pipe and a branch line thereof wherein the branch line incorporates a first embodiment of an adjustable pipe coupling in accordance with the invention.

With reference to FIG. 1, it is a design preference that the coupling 100 in accordance with the invention more effectively solves problems with known construction practices. That is, building codes nowadays might dictate that sewage drain pipes 150 cannot be placed level but must have a downslope of no less than (say, for example) a 48:1 ratio (that is, for each twelve inches of run, there must be at least a quarter inch downslope). Nowadays building construction—not only commercial or institutional but also the most modest of residential buildings—is typically completed by an assortment of subcontractors. A first subcontractor's job might be to lay the sewage drain pipe 150 including some projecting taps and fittings (eg., 154-156), and second subcontractor's job might be to cover the sewer pipe (but not the taps) in a concrete slab (not shown).

The applicable building codes only set a minimum slope-requirement. Often times, to be assured to meet the minimum slope-requirement, both the sewer-pipe subcontractor and concrete-slab subcontractor might practice conservative measures which altogether insure that the 48:1 ratio is surely exceeded. The problem is, a third subcontractor will typically be responsible for coupling-up with the projecting taps and fittings 154-156 for the remainder of the fluid-, wire- or cable-conducting pipe or tube network for the building. The third subcontractor's job is conflicted by the situation that (i) the building plans call for vertical pipes 158 to extend along true vertical, however, (ii) the taps and fittings 154-156 are not true to the horizontal or vertical, and just how much off-angle from true cannot be predicted in advance until the first and second subcontractors' jobs are done.

To date, the problem has been handled less than effectively. Sometimes the taps are provided merely by Tee-fittings (not shown), which provide a hard 90° branch exactly. But then the 90° intersection off a sloping sewage drain pipe (eg., 150) makes for a tilted tap. Other times, more conscientious sewer-pipe subcontractors have replaced the single Tee-fitting design (again, not shown) with three different other fittings in total. That is, the original tap (which is also a fitting) off the sewer line is Y-branch 154 level with the downgrade plane of the sewer line. The succeeding fitting is a hard 45° angle fitting 155, again more or less level with the downgrade plane of the sewer line. The ultimate fitting among the three is a hard Eli (or 90° fitting, and indicated by reference numeral 156) turned up to be true with vertical.

These taps and fittings 154-156 provide some slip among themselves. That is, the sewer-pipe subcontractor may have trued everything up, with some modest misalignment between the various taps and fittings 154-156, and then solvent-welded all the construction together such that the taps and fittings 154-156 make the vertical pipe 158 more or less true with vertical. But then, the concrete-slab subcontractor inherits the work of the sewer-pipe subcontractor and likely messes up the delicate alignment, without much thought or consideration for the plumbing subcontractor who follows.

Accordingly, the coupling 100 in accordance with the invention provides a solution for the shortcomings of the prior art. The ball-formed end of the ball-formed link 106 seats in the spherically-widening seat surface of the seat-formed link 102. The socket-forming collar 108 slides loosely over the fitting extension 116 of the ball-formed link 106 until its sleeve 118 slides tightly over the sidewall of the seat-formed link 102. Then the socket-forming collar 108 is slid some more until the spherically-narrowing socket surface thereof starts to clamp down on the ball-formed end of the ball-formed link 106.

On a job site, a worker can do the following. As stated above, preferably the seat-formed link 102's fitting extension 112 is configured as a receiving fitting. This allows the worker to slide the seat-formed link 102's fitting extension 112 down over the end of a tap (or whatever, and this is not shown) until the end of the inserted conduit limits out against the annular flange 114. Preferably, the annular flange 114's inner diameter is chosen by design to match the inserted conduit's inner diameter (not shown). That way, there is a smooth transition between the hollow core of the seat-formed link 102's spherically-widening seat and the central bore of the inserted conduit (which is not shown). At this stage, the worker can freely swivel or adjust the ball-formed link 106 until the custom angle is achieved. The worker can then ● apply solvent to the ball or seat, or else squirt solvent to flow between the ball and seat, ● plunge the socket-forming collar 108 all the way down to clamp the ball against the seat-formed link 102, ● apply or squirt solvent between the ball and socket-forming collar 108, ● apply or squirt solvent between the socket-forming collar 108's sleeve 118 and seat-formed link 102's outer sidewall, and so on.

As a result, the coupling 100 in accordance with the invention should rigidify into a virtually monolithic construction of solid material. The welded (cemented) coupling 100 is furthermore leak tight as well.

Figure 2:
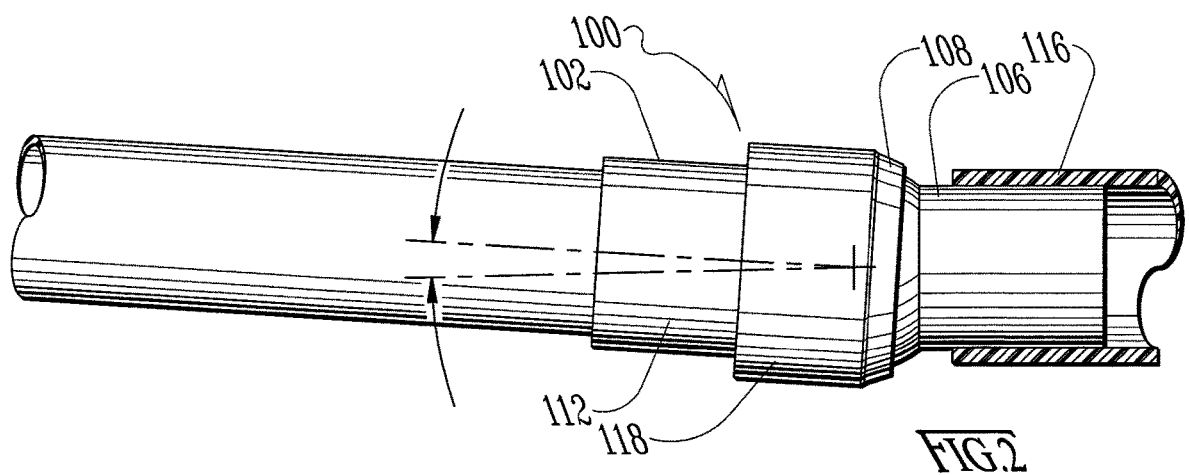
FIG. 2 is an enlarged-scale side elevational view, partly in section, of the branch line of FIG. 1, including the adjustable pipe coupling in accordance with the invention.
Figure 5:
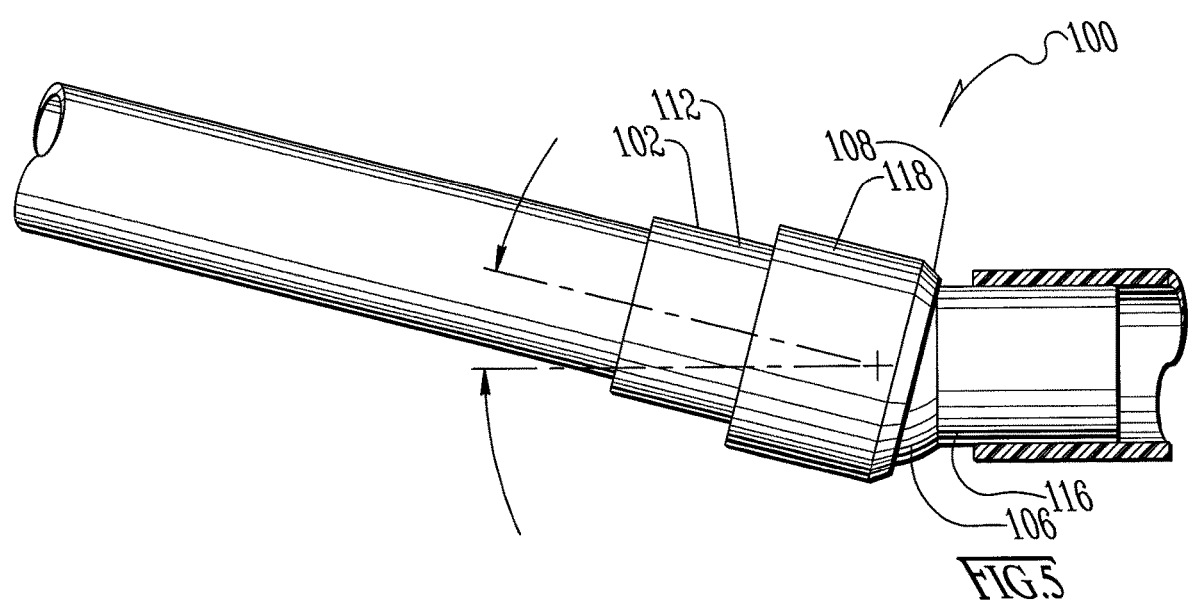
FIG. 5 is a side elevational view comparable to FIG. 2 except showing the coupling adjusted to subtend about a 15° angle.

It is a design preference that the socket-forming collar 108 be configured to allow the ball-formed link 106 to swivel anywhere to a maximum angle of axial-misalignment of about 15°. In FIG. 2, however, the coupling 100 is shown adjusted to subtend only about a 5° (five degree) angle. In contrast, FIG. 5 shows the coupling adjusted to subtend about a 15° (fifteen degree) angle. Given the foregoing, larger angles can be obtained by chaining together a series of couplings 100 in accordance with the invention in order to obtain angles of 22½°, 30°, 45°, 60°, 90° and so on. Accordingly, it is preferred if one fitting extension (eg., 112) is a receiver and the other (eg., 116) an insert so that the inventive coupling 100 can be directly hooked up to another like coupling 100 (only one shown) without a nipple.

It is another design preference that ball-formed end's opening is rimmed by the beveled edge 122 and that the inserted conduit in the receiving fitting extension 112 matches up flush with the annular flange 114 in order to eliminate bumps in the hollow through channel. This serves both fluid service as well as electrical service. That is, electricians running or pulling wire or cable don't want bumps because such will catch their pushing or pulling tackle. Likewise, when it comes to unclogging drains, parties running a plumber's snake don't want bumps because such will impede the advance of the tip end on the way toward the clog.

Pause can be taken now to consider an issue with the coupling 100 in accordance with the invention. That is, the coupling 100 is preferably assembled with the links 102 and 106 axially aligned at first (that is, arranged in a straight line, not an angle). This allows the socket-forming collar 108 to be slid along the ball-formed link 106's fitting extension 116 and to be continued to be slid over and along the seat-formed link 102's seat-formed end's outer sidewall the until the socket-forming collar 108's spherically widening seat surface stops against the ball-formed link 106's ball-formed end's spherical bulb. At that time or stage of things, a worker can adjust the angle subtended between the links 102 and 106 before the bonding between all the parts firms up and sets into rigidity.

In other words, a worker cannot proceed out of order, and subtend an angle of say 5° to 15° (five to fifteen degrees) first, and then attempt to slide the socket-forming collar 108 into place, because the socket-forming collar 108 cannot make the turn.

FIGS. 6-9 show an alternate embodiment of an adjustable pipe coupling 200 in accordance with the invention which allows a worker to proceed in ways not readily possible with the previous embodiment of a coupling 100 in accordance with the invention.

This adjustable pipe coupling 200 comprises the same ball-formed link 106 as before. In contrast, this adjustable pipe coupling 200 comprises a socket-forming link 202 and a banding collar 208.

The socket-forming link 202 comprises a fitting extension 212 as before but differs in having a socket-forming end comprising an assembly of two divisible jaws 232 and 234. That is, the socket-forming link 202's socket-forming end is split between a removable jaw 232 in contrast to an opposed, permanently-attached jaw 234 which is permanently attached, to be more specific, to the fitting extension 212.

As an aside, preferably but without limitation the socket-forming link 202's fitting extension 212 is configured as a receiver (eg., female fitting) for purposes described previously. The fitting extension 212 also preferably includes an annular flange that serves as a stop surface for whatever sort of pipe, tube or conduit gets inserted therein.

Figure 6:
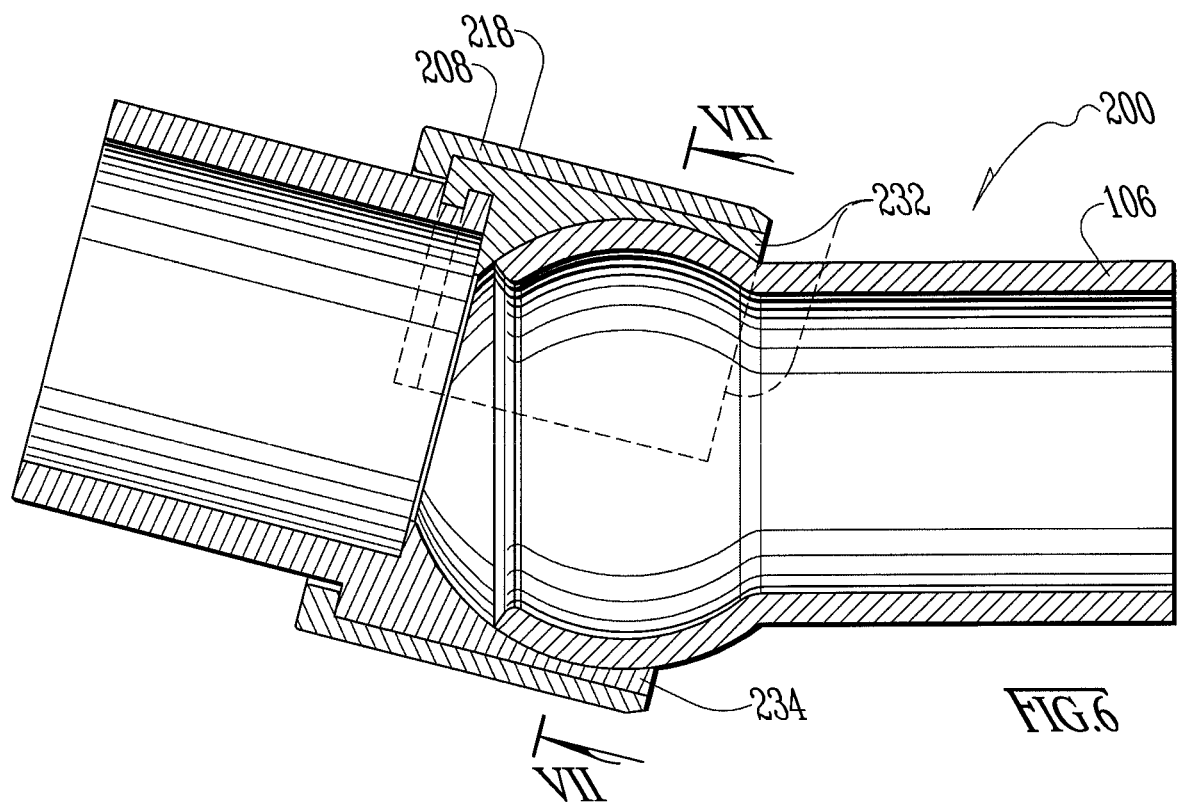
FIG. 6 is a sectional view comparable to FIG. 3 except of an alternate embodiment of the coupling in accordance with the invention.
Figure 7:
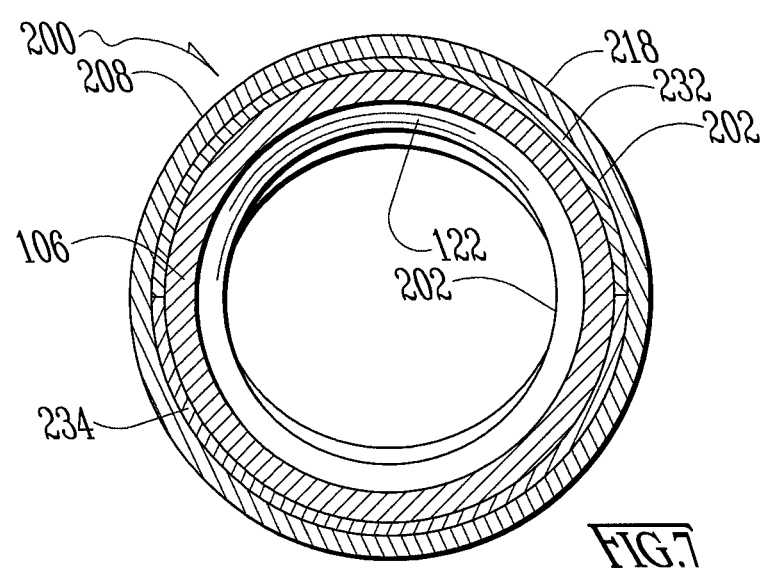
FIG. 7 is a sectional view taken along line VII-VII in FIG. 6.
Figure 8:
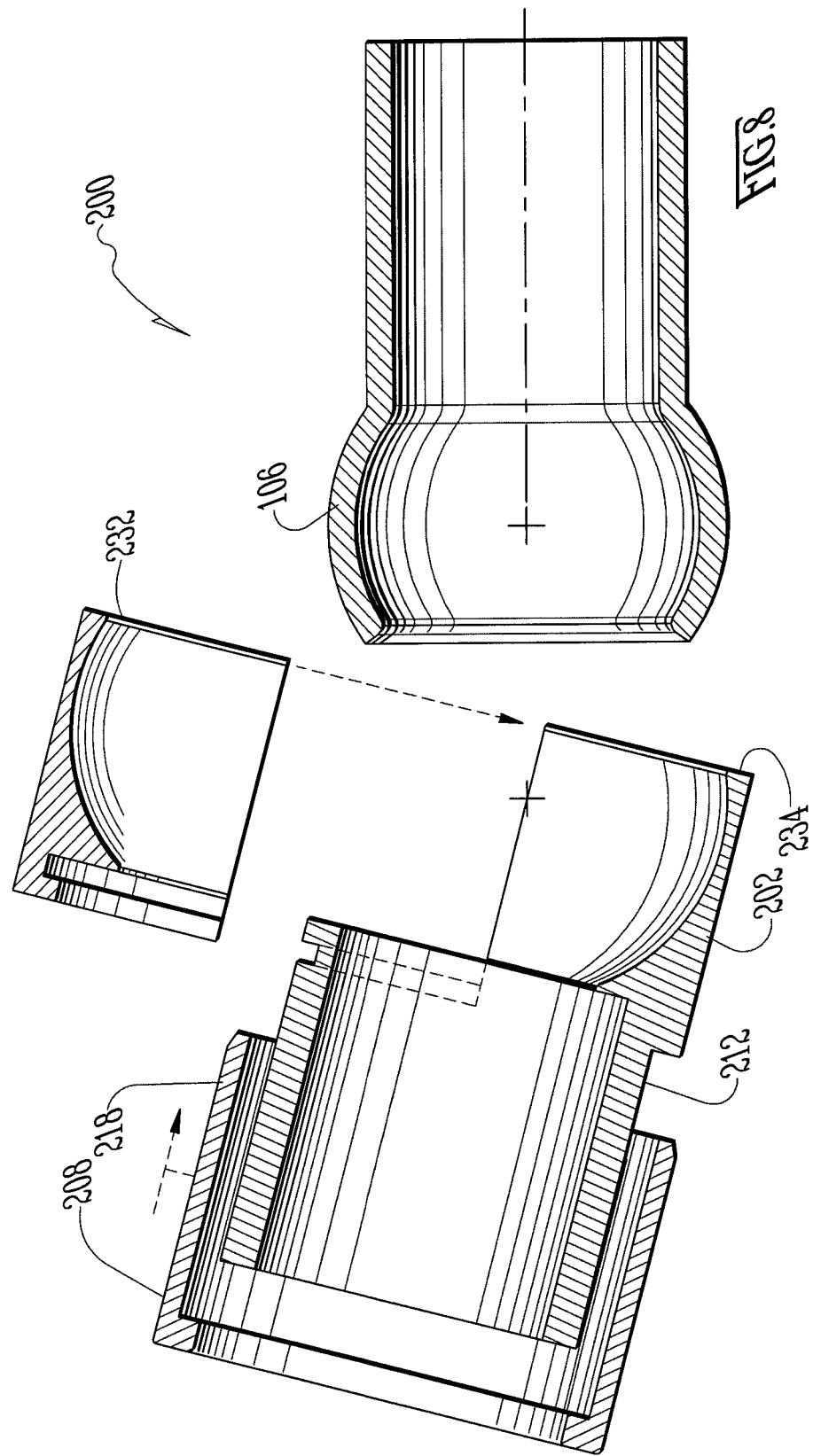
FIG. 8 is a sectional view comparable to FIG. 7 except exploded in part.
Figure 9:
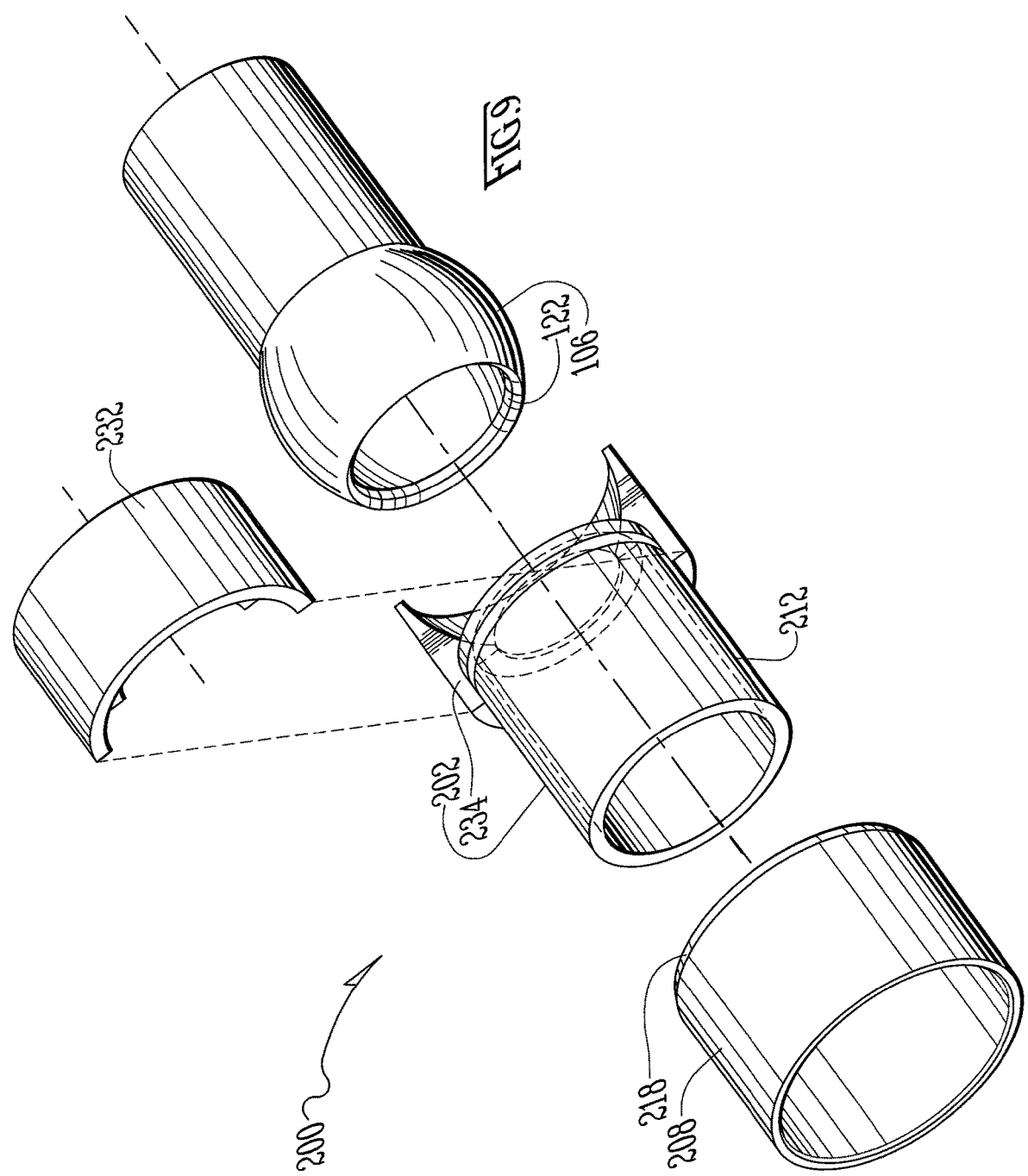
FIG. 9 is a more-fully exploded perspective view thereof.
Figure 10:
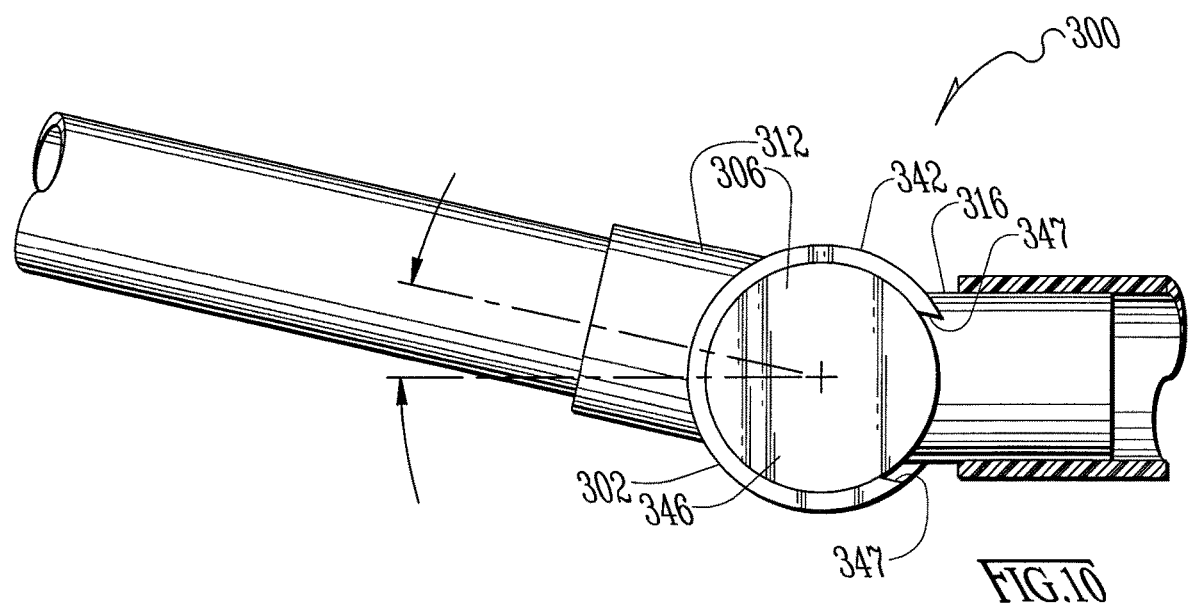
FIG. 10 is a side elevational view comparable to FIG. 2 or 5 except showing another embodiment of an adjustable pipe coupling in accordance with the invention.
Figure 11:
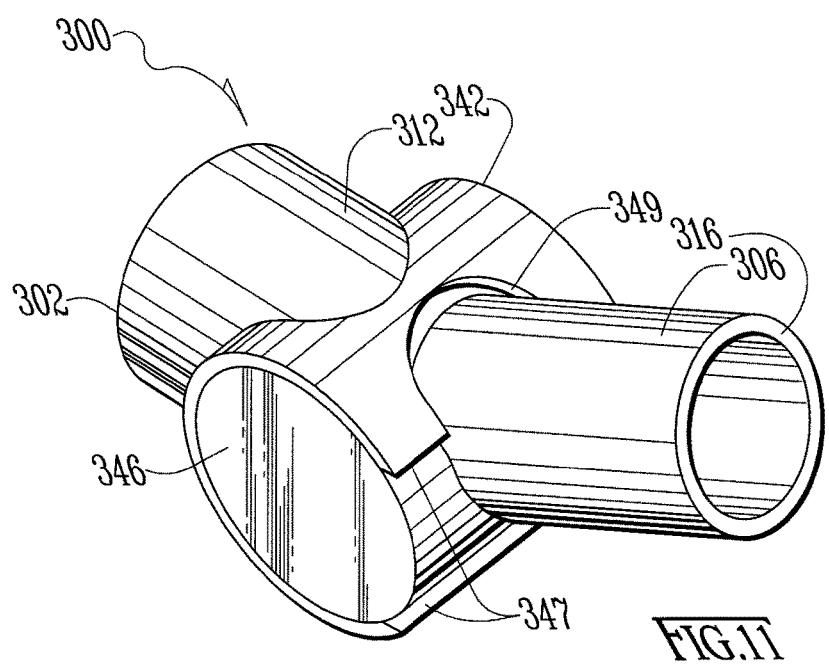
FIG. 11 is an enlarged-scale perspective view of the coupling of FIG. 10, and as shown in isolation.
Figure 12:
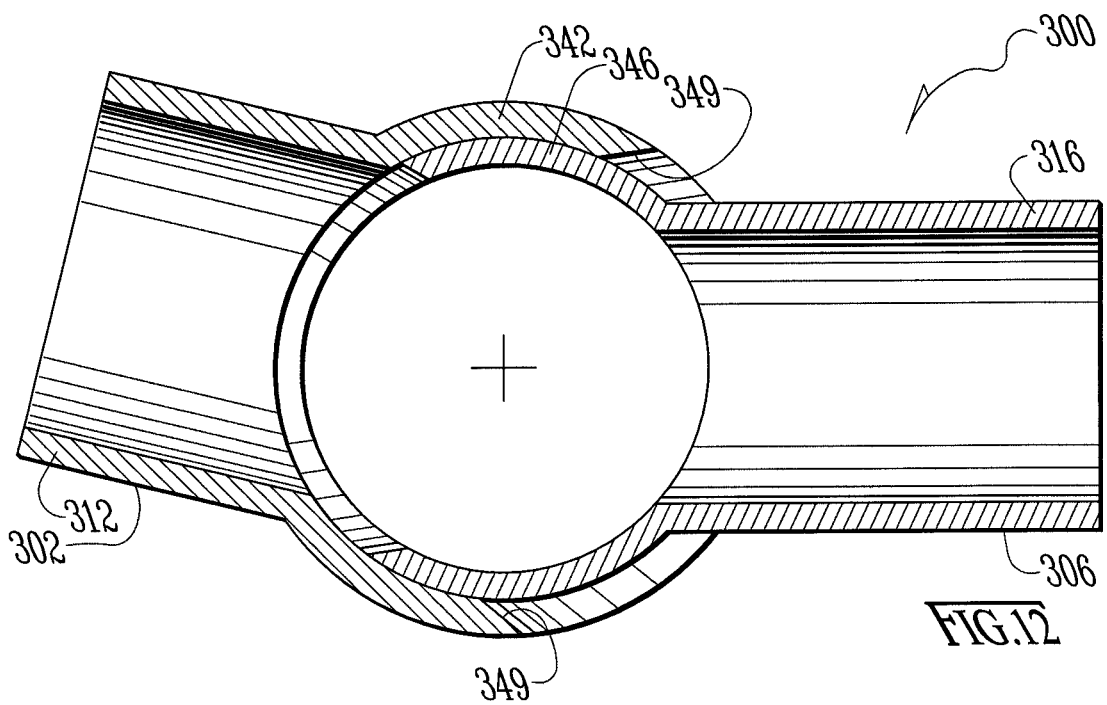
FIG. 12 is a sectional view thereof comparable to FIGS. 3 and 6 except of the inventive coupling in accordance with FIG. 11.

To return to the more distinguishing matters of the jaws 232 and 234, FIG. 8 shows better the removable jaw 232 in a removed, radially-spaced away position relative to the permanently attached jaw 234 (FIG. 9 also provides illustration of this as well). FIG. 6 shows better the two jaws 232 and 234 brought together in a closed or clamping position. In the clamping position (as shown by FIG. 6), the two jaws 232 and 234 provide a configuration comprising a spherically-smooth widening socket surface, as well as an outer sidewall. The banding collar 208 comprises a cylindrical sleeve 218 having a centrally-apertured flange at one end. The banding collar 208's sleeve 218 is sized and arranged for a sliding telescopic-fit over the outer sidewall that is only present when the mated jaws 232 and 234 of the socket-forming link 202 are mated in the clamping position (and as shown, eg., by either FIG. 6 or 7).

The coupling 200 of FIGS. 6-9 is distinguishable from the coupling 100 of FIGS. 1-5 in many ways including the following. That is, the FIGS. 6-9 coupling 200 assembles together with the banding collar 208 sliding axially on—not the ball-formed link 106, but—the socket-forming link 202 (and as indicated in FIG. 8).

Given the foregoing, the coupling 200 of FIGS. 6-9 allows assembly in a distinguishing fashion. Briefly, an angle between the two links 202 and 106 in the range of say 5° to 15° (five to fifteen degrees) can be subtended first before the sliding over of the banding collar 208.

This aspect of the invention is particularly advantageous when a worker has pre-joined the links 202 and 106 to respectively different twenty foot (~6 m) sections of conduit prior to determining the angle (this is not shown). In other words, the worker finds it more accurate to arrange the twenty foot (~6 m) sections in their angle to each other, and then assemble the coupling 200 with the arrangement of the twenty foot (~6 m) sections resting intact.

In consequence, the steps to assemble the coupling 200 with the links 202 and 106 already arranged in an angle (in the range of say 5° to 15°, or five to fifteen degrees) preferably comprise the following. That is, this coupling 200 is preferably assembled with the ball-formed link 106 and the socket-forming link 202 (minus the removable jaw 232) aligned in the chosen end-angle from the outset. Next, welding solvent is applied between about half of the ball-formed link 106's ball-formed end's spherical bulb and the socket-forming link 202's permanently-attached jaw 234's socket-forming surface. After that, welding solvent is applied between the remainder of the ball-formed link 106's ball-formed end's spherical bulb and the removable jaw 232's socket-forming surface. The removable jaw 232 is moved into the clamping position (which movement is indicated in FIG. 8, and which clamping position is shown by FIG. 6). Then the banding collar 208 is slid along the seat-formed link 102's fitting extension 212 and is continued to be slid over and along the socket-forming link 202's socket-forming end's outer sidewall the until the banding collar 208's flange abuts a step or shoulder of the socket-forming link 202's socket-forming end's outer sidewall. Welding solvent is also applied to bond things tight.

By doing the foregoing, a worker achieves in bonding together firmly and tightly the socket-forming link 202's jaws 232 and 234 clamp on the ball-formed link 106's ball-formed end's spherical bulb. Thus, the angle between the links 202 and 106 was adjusted to prior to assembly, not after.

It is another aspect of the invention that the removable jaw 232 comprises a semicircular (eg., semi-cylindrical) tongue-and-groove corresponding to a counterpart semicircular (or semi-cylindrical) groove-and-tongue in the socket-forming link 202, as shown better by FIGS. 6 and 8.

Figure 13:
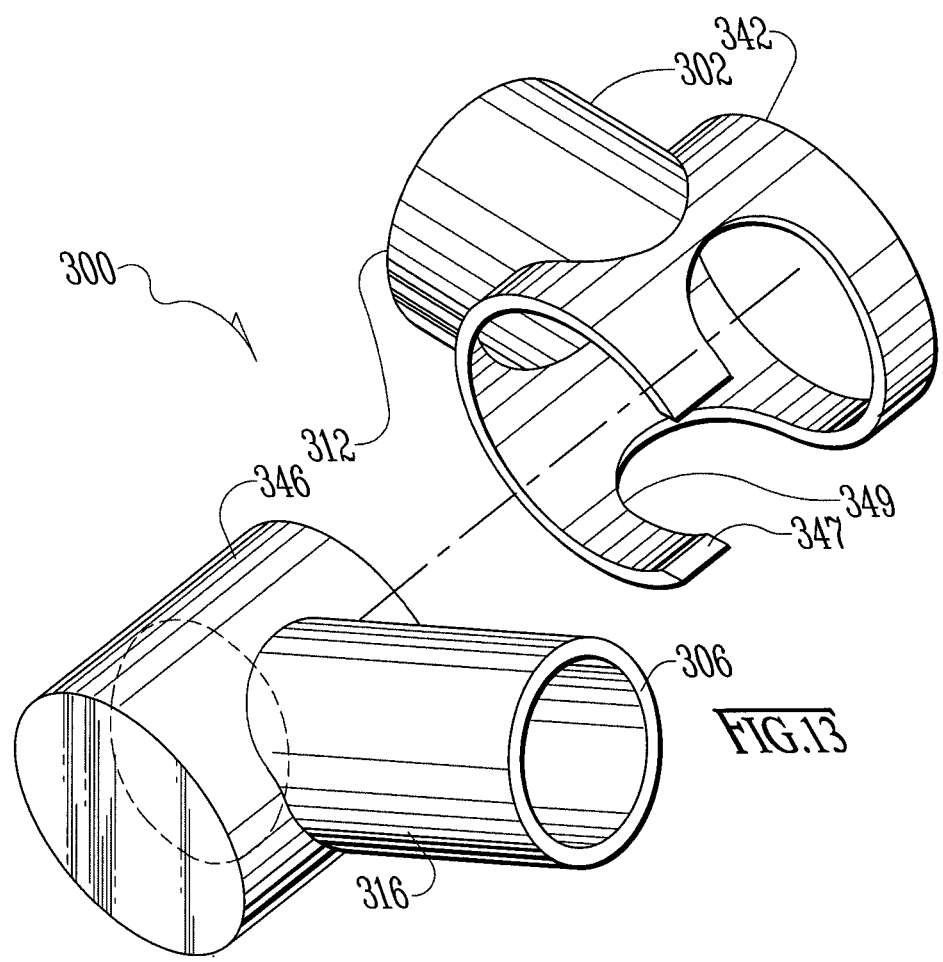
FIG. 13 is a reduced-scale, exploded perspective view of FIG. 11.

FIG. 10-13 show another embodiment of an adjustable pipe coupling 300 in accordance with the invention, comprising a swivel coupling 300. The swivel coupling 300 comprises a first hollow link 302 having a fitting extension 312 intersecting in T-fashion a transverse outer sleeve 342 and a second hollow link 306 having a fitting extension 316 intersecting in T-fashion a transverse inner sleeve 346. The outer sleeve 342 is cylindrical and extends between an open end and a closed end. The inner sleeve 346 is correspondingly cylindrical so it can be telescoped inside the outer sleeve 342 as shown in FIG. 13, into a fully docked position as shown better by FIG. 11.

The outer sleeve 342 is formed with a radial entry slot 340 in the open end thereof permitting passage of the second link 306's fitting extension 316. The radial entry slot 347 terminates in a T-intersection with a closed-ended (partially) circumferential slot 349 in the outer sleeve 342 which permits angular passage of the second link 306's fitting extension 316 while the angle subtended therebetween is being adjusted.

FIGS. 14 through 18 show a further embodiment an adjustable pipe coupling 400 in accordance with the invention, comprising a further variation on a ball-and-socket style coupling 400, such that it includes an offset option.

Figure 14:
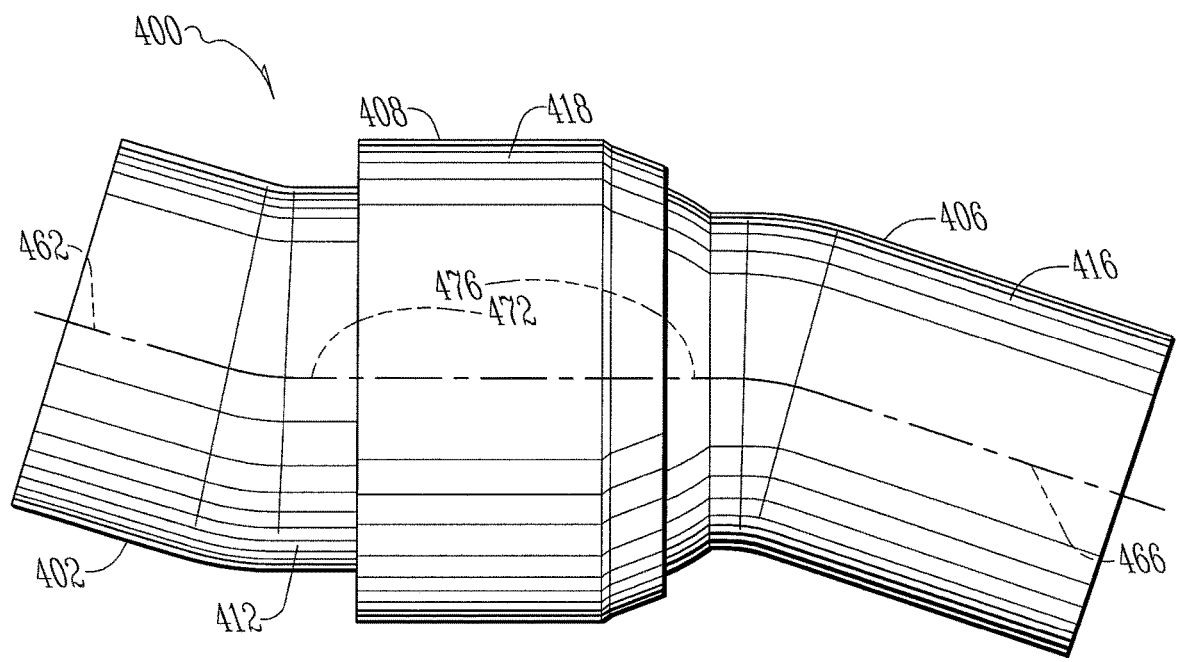
FIG. 14 is a side elevational view comparable to FIG. 2 except showing a further embodiment of an adjustable pipe coupling in accordance with the invention.
Figure 15:
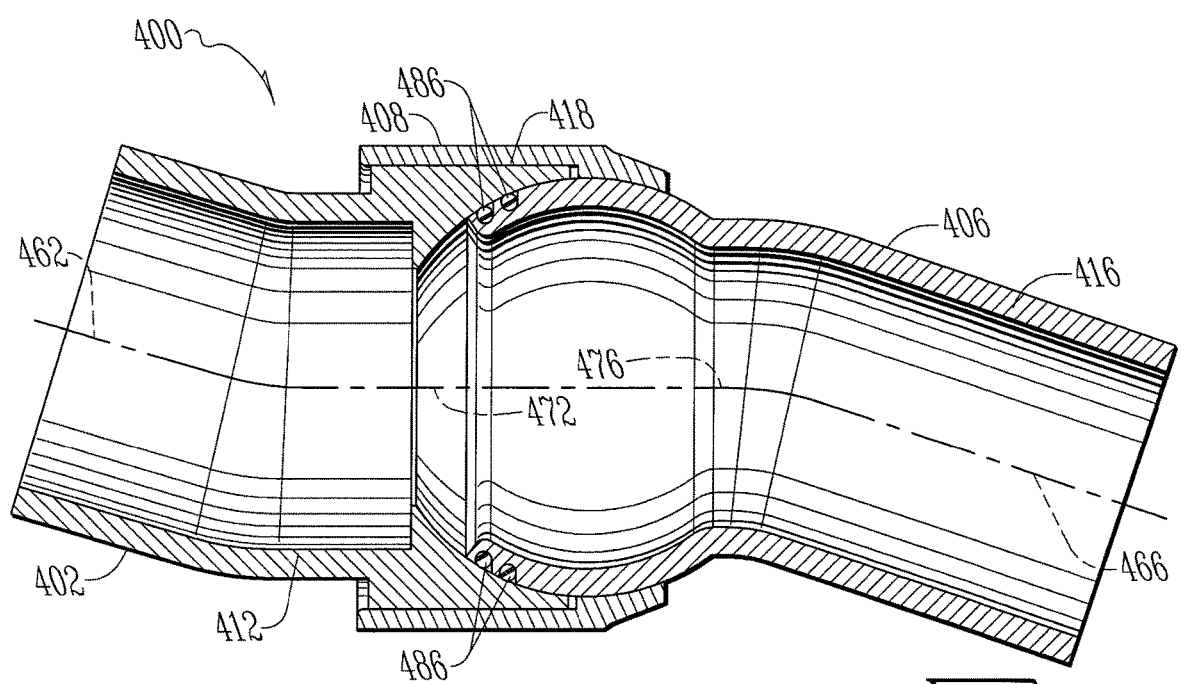
FIG. 15 is a sectional view thereof comparable to FIG. 3 except of the inventive coupling in accordance with FIG. 14.
Figure 16:
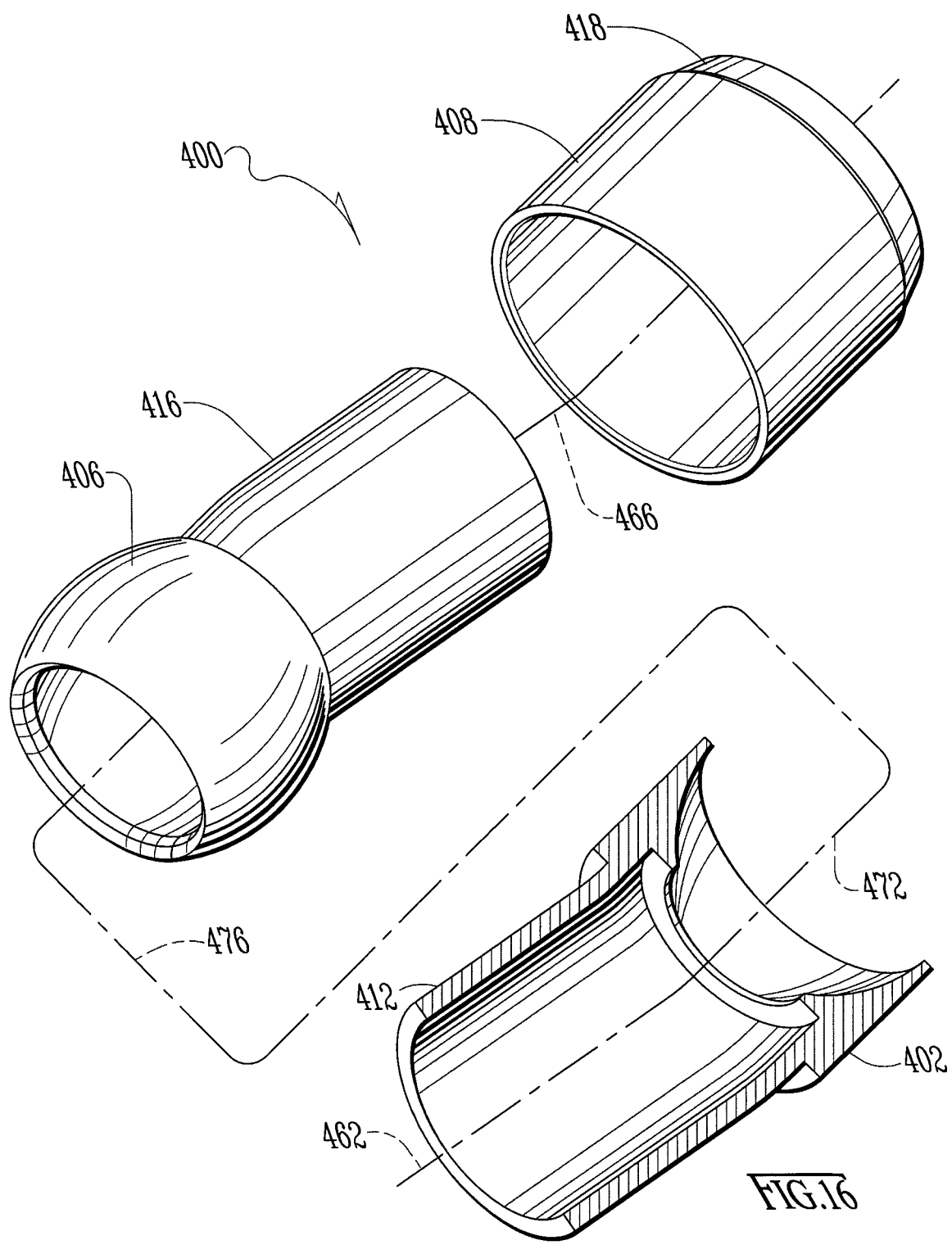
FIG. 16 is an exploded perspective view, partly in section, comparable to FIG. 4 except of the inventive coupling in accordance with FIGS. 14 and 15 hereof.

With general reference to FIGS. 14 through 16, these views show better the ball and socket coupling 400 in accordance with the invention being adjusted to the offset position. The inventive coupling 400 comprises a seat-formed link 402 as well as a counterpart ball-formed link 406, and then also a socket-forming collar 408 therefor.

The seat-formed link 402 comprises a seat-formed end as well as a fitting extension 412 extending axially away from the seat-formed end. The fitting extension 412 is cylindrically formed around one central axis 462, and the seat-formed end is cylindrically arranged around another central axis 472 that intersects the one central axis 462 at an angle chosen according to design preference. It is one non-limiting preference in accordance with the invention that the two axes 462 and 472 intersect at about a 30° angle. Preferably but without limitation the fitting extension 412 hereof is configured as a receiver (eg., female fitting) in contrast to an insert (eg., male fitting). The fitting extension 412 includes an annular flange 414 that serves as a stop surface for whatever sort of pipe, tube or conduit gets inserted therein.

The ball-formed link 406 comprises a ball-formed end as well as a fitting extension 416 extending axially away from the ball-formed end. The fitting extension 416 is cylindrically formed around one central axis 466, and the ball-formed end is cylindrically arranged around another central axis 476 that intersects the one central axis 466 at an angle chosen according to design preference. It is one non-limiting preference in accordance with the invention that the two axes 466 and 476 intersect at about a 30° angle. Preferably but without limitation the fitting extension 416 hereof is configured as an insertion fitting in contrast to a receiving fitting for purposes more particularly described below.

The socket-forming collar 408 comprises a centrally-apertured web and a cylindrical sleeve 418 extending axially away from the centrally-apertured web.

The ball-formed link 406's ball-formed end comprises a hollow spherical bulb terminating in an opening rimmed by a beveled edge. The ball-formed link 406's ball-formed end further comprises one or more O-ring grooves for seating O-rings 486 therein. The seat-formed link 402's seat-formed end comprises a conforming, spherically-widening seat surface, as well as an outer sidewall. The O-rings 486 provide a seal between the ball-formed end of the ball-formed link 406 and the spherical seat surface of the seat-formed link 402. This seal provided by the O-rings 486 is allows movement of the seat-formed link 402 relative to the ball-formed link 406 yet still provides a seal. Unlike the couplings 100 or 200 and 300 above, this coupling 400 need not be glued tight. The O-rings 486 provide the seal.

Hence this coupling 400 can be implanted in a casting of a concrete pour. The hardening of the concrete to cement will hold the coupling stationary. Nevertheless, the O-rings 486 will permit a little wiggle in the coupling 400 and still hold the seal. Optionally, the coupling can be glued tight as desired.

The collar 408's centrally-apertured web comprises a conforming, spherically-narrowing socket surface. The sleeve 418 is sized and arranged for a sliding telescopic-fit over the seat-formed link 402's sidewall of the seat-formed end.

FIG. 15 shows the coupling 400 adjusted to an offset position. The axis 462 of the fitting extension 412 of the seat-formed link 402 is parallel to the axis 466 of the fitting extension 416 of the ball-formed link 406, but the two axes 462 and 466 are offset from one another. Nevertheless, if axis 466 of the ball-formed link 406 is true to vertical, so will be the axis 462 of the seat-formed link 402. The axis of 472 of the seat-formed link 402's seat formed end and the axis 476 of the ball-formed link 406's ball formed end are coaxial with each other.

Figure 17:
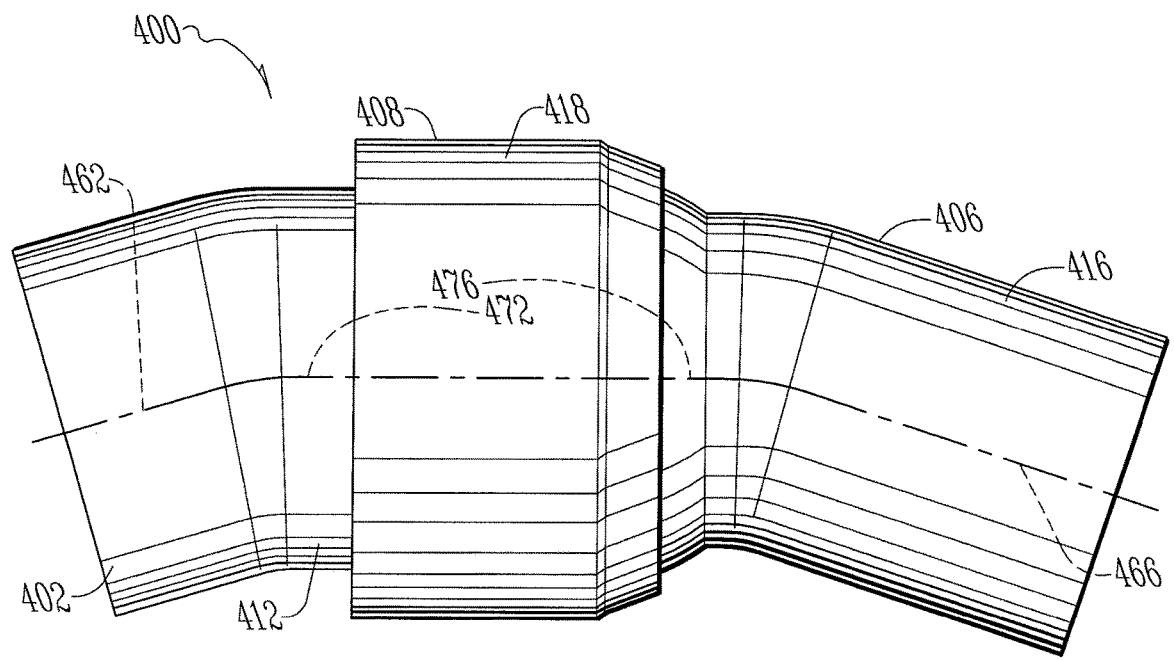
FIG. 17 is a side elevational view comparable to FIG. 14 except showing the coupling adjusted for sub-tending its maximum angle.
Figure 18:
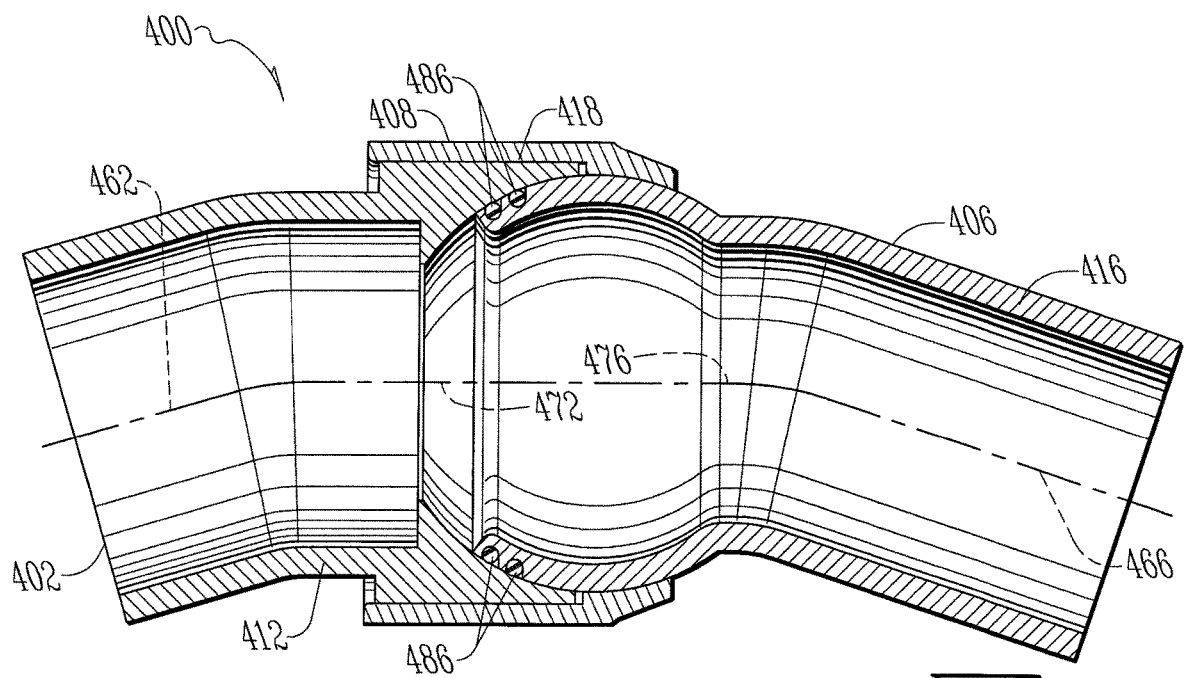
FIG. 18 is a sectional view comparable to FIG. 15 except showing the coupling adjusted to the position as in FIG. 17, ie., sub-tended to its maximum angle.
Figure 19:
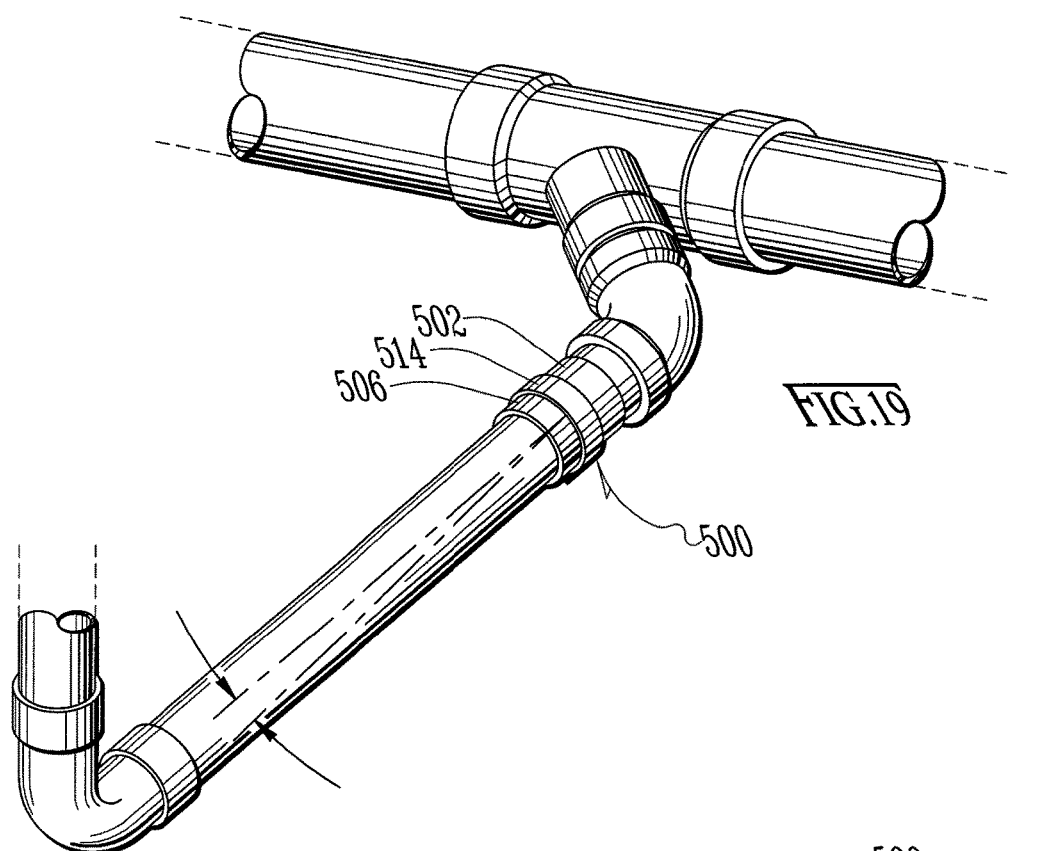
FIG. 19, like FIG. 1, is a perspective view of a plumbing intersection between a sewage drain pipe and a branch line thereof, except this branch line incorporates an additional embodiment of an adjustable pipe coupling in accordance with the invention.
Figure 20:
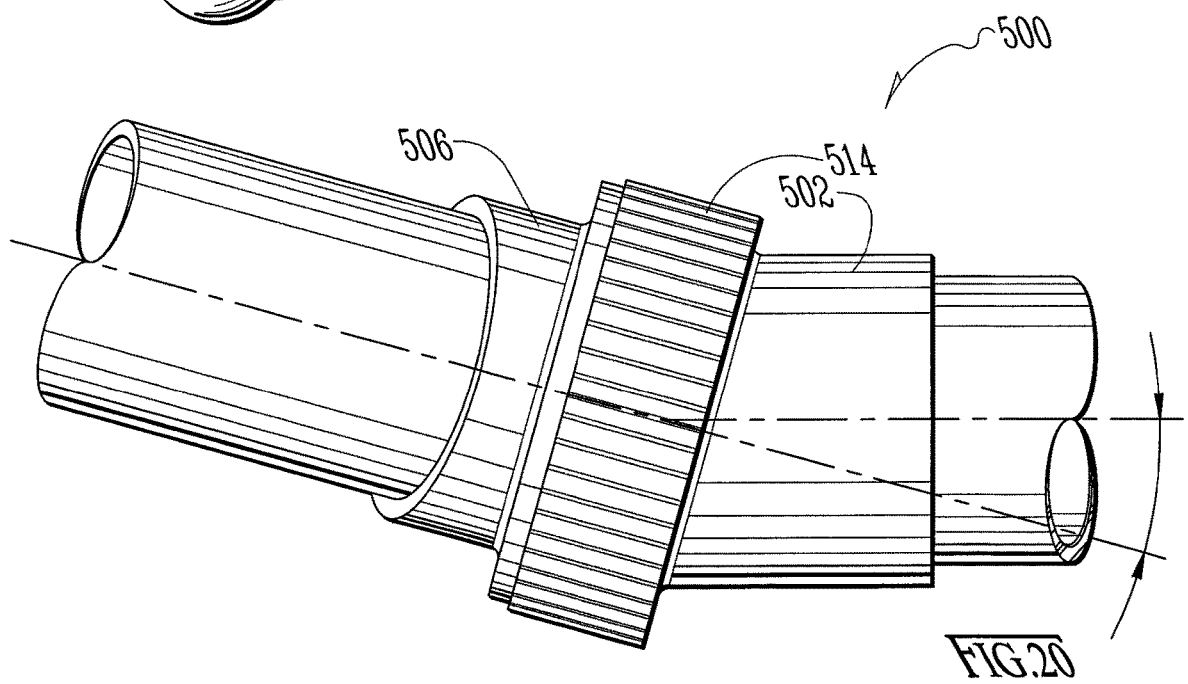
FIG. 20 is an enlarged-scale side elevational detail view of the branch line of FIG. 19, with the coupling thereof adjusted to subtend an angle of about 25°.

To turn to FIGS. 17 and 18, these views show the coupling 400 adjusted for sub-tending the maximum angle it can be adjusted too. As shown in FIGS. 14 through 16, the axis of 472 of the seat-formed link 402's seat formed end and the axis 476 of the ball-formed link 406's ball formed end are coaxial with each other. Unlike FIGS. 14 through 16, the coupling 400 as adjusted in FIGS. 17 and 18 has the axis 462 of the fitting extension 412 of the seat-formed link 402 and the axis 466 of the fitting extension 416 of the ball-formed link 406 closing to the maximum angle that they can close to each other. Since each link 402 and 406 forms a 15° bend, the maximum angle the two links 402 and 406 can close to one another is the result of subtracting the a 15° bend of the one link 402 as well as the a 20° bend of the other link 406 from 180°, which is 150°.

In other words, the two axes 466 and 476 can extend away from each other at about a 30° angle. Other maximum angles could be obtained by re-designing the links 402 and 406 with different bend angles, as persons ordinarily skilled in the art would readily recognize.

FIGS. 19 through 26 show an additional embodiment of an adjustable pipe coupling 500 in accordance with the invention. The inventive coupling is useful for all kinds of plumbing applications including for fluid-, wire- or cable-conducting pipes or tubes and the like.

The inventive coupling 500 comprises a female flange link 502 as well as a counterpart male flange link 506.

The female flange link 502 can be alternately characterized as a seat-formed link, or a collared-socket link, or else a receiver link. In contrast, the male flange link 506 can be alternately characterized as an insert link.

The male flange link 506 comprises a male flange end 510 as well as a fitting extension 516 extending axially away from the male flange end 510. The fitting extension 516 has an axial lumen on one axis and the male flange end 510 has its own axial lumen on another axis intersecting the axis of the fitting extension 516 at about a 12.5° angle. In other words, the respective axes of the male flange end 510 and fitting extension 516 are offset by 12.5° (or so, to whatever angle by design choice).

The female flange link 502 comprises a collared-socket end 514 as well as a fitting extension 512 extending axially away from the collared-socket end 514. The collared-socket end 514 has an axial lumen on one axis and the fitting extension 512 has its own axial lumen on another axis intersecting the axis of the collared-socket end 514 at about a 12.5° angle. Again, the respective axes of the collared-socket end 514 and fitting extension 512 are offset by 12.5° (or so, to whatever angle by design choice).

The male flange end 510 has an interior sidewall portion 520 that comprises 12.5° wedge of a cylindrical sidewall. The collared-socket end 514 correspondingly has an interior sidewall portion 524 that comprises 12.5° wedge of a cylindrical sidewall. The the male flange end 510 has an exterior cylindrical sidewall that fits into a cylindrical socket of the collared-socket end 514, both which are at the 12.5° offset relative their respective fitting extensions 516 and 512. The male flange end 510 and collared-socket end 514 both have mating flange surfaces which, while perpendicular to the local axis of the male flange end 510 or collared-socket end 514, are tilted to the offset angle of 12.5° of the respective fitting extension 512 or 516 therefor.

Figure 25A:
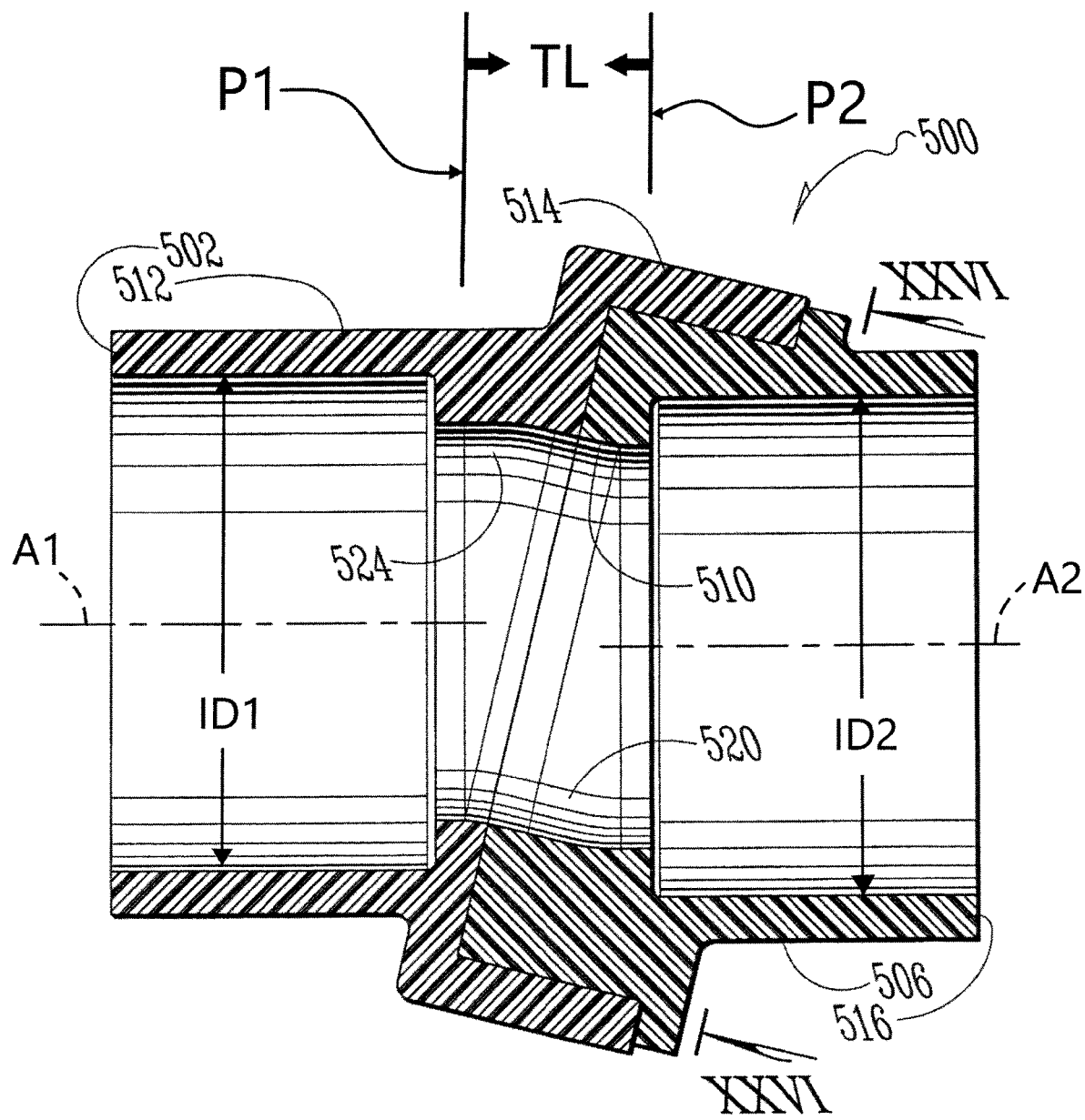
FIG. 25A is a section view comparable to FIG. 23 except with the coupling adjusted to subtend an angle of about 0°.
Figure 25B:
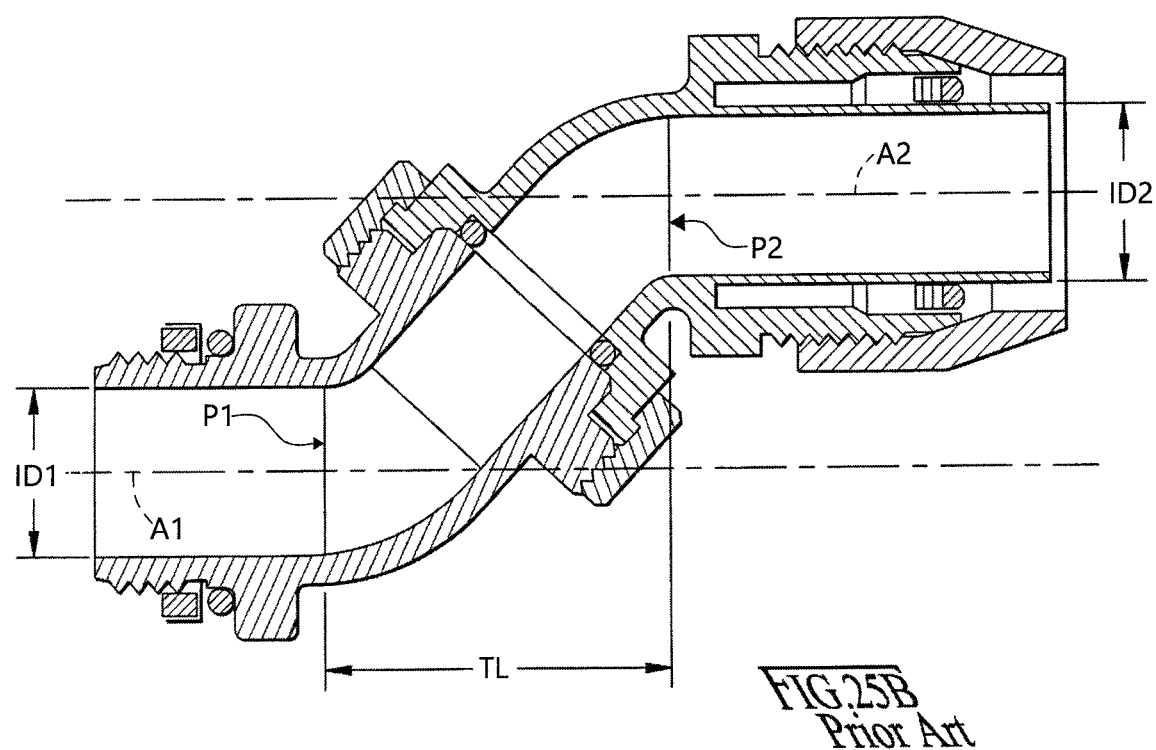
FIG. 25B is a section view comparable to FIG. 25A except showing a coupling in accordance with the prior art likewise adjusted to subtend an angle of about 0° and to the contrast to FIG. 25A, wherein this FIG. 25B corresponds to FIG. 6 of U.S. Patent Publication No. 2007/0246258 of Magno.

FIG. 25 shows that the two halves (ie., links 502 and 506) of the coupling 500 have been twisted such the two 12.5° offsets cancel each other. That way, the fitting extension 512 of female flange link 502 and the fitting extension 516 of male flange link 506 are adjusted relative to each other such that there is 0° deviation from the central axes of the fitting extensions 512 and 516 being parallel (but in this view, not quite co-linear) with each other.

Figure 23:
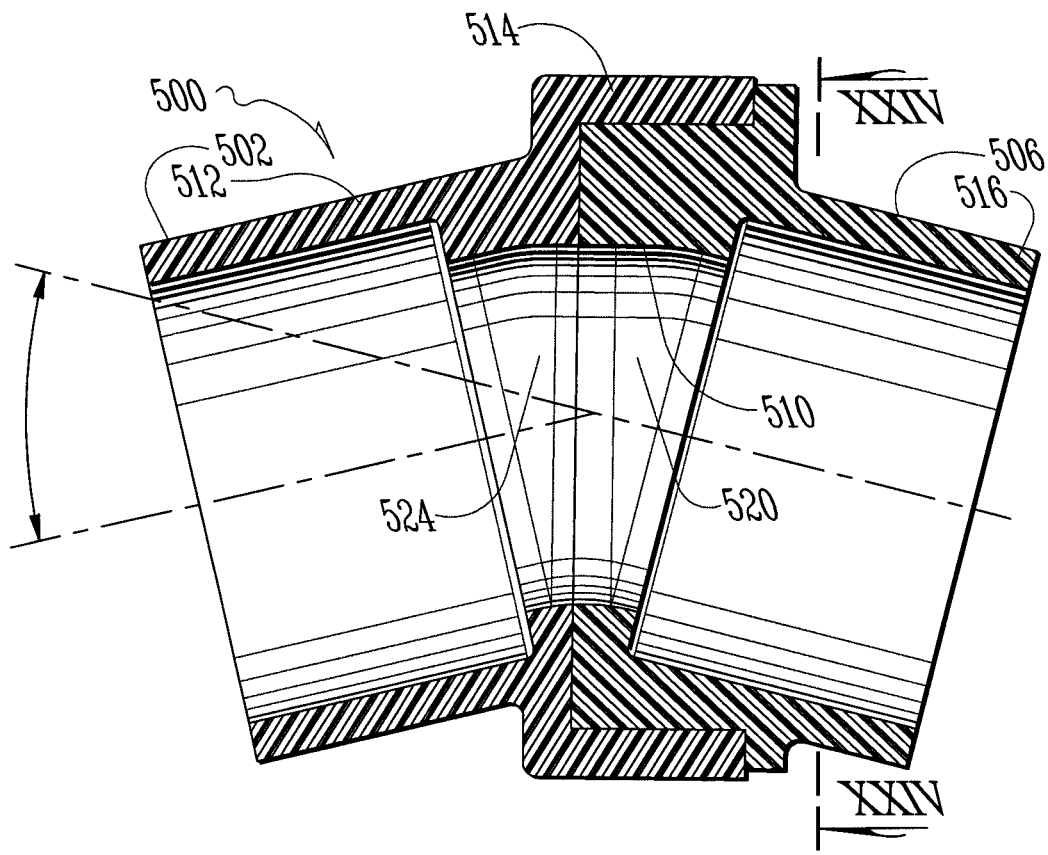
FIG. 23 is an enlarged-scale section view take along line XXIII-XXIII in FIG. 21.

In contrast, FIG. 23 shows that the two halves (ie., links 502 and 506) of the coupling 500 have been twisted such the two 12.5° offsets add to each other. That way, the fitting extension 512 of female flange link 502 and the fitting extension 516 of male flange link 506 are adjusted relative to each other such that they tend to subtend a 25° angle relative to each other.

It is a design preference that the coupling 500 as a whole—eg., the two links 502, 506—is(are) are all constructed of polyvinyl chloride (PVC) or the like because such is solvent-weldable material. To put this differently, it is a design preference that—once the links 502 and 506 are assembled on a job site and adjusted to a custom angle by trial-and-error swivelling to match the needs of a given, particular end-utilization—such a custom adjustment can be "cemented" permanently in place by any suitable solvent, or else glue, cement, any other suitable bonding compound and so on.

Figure 21:
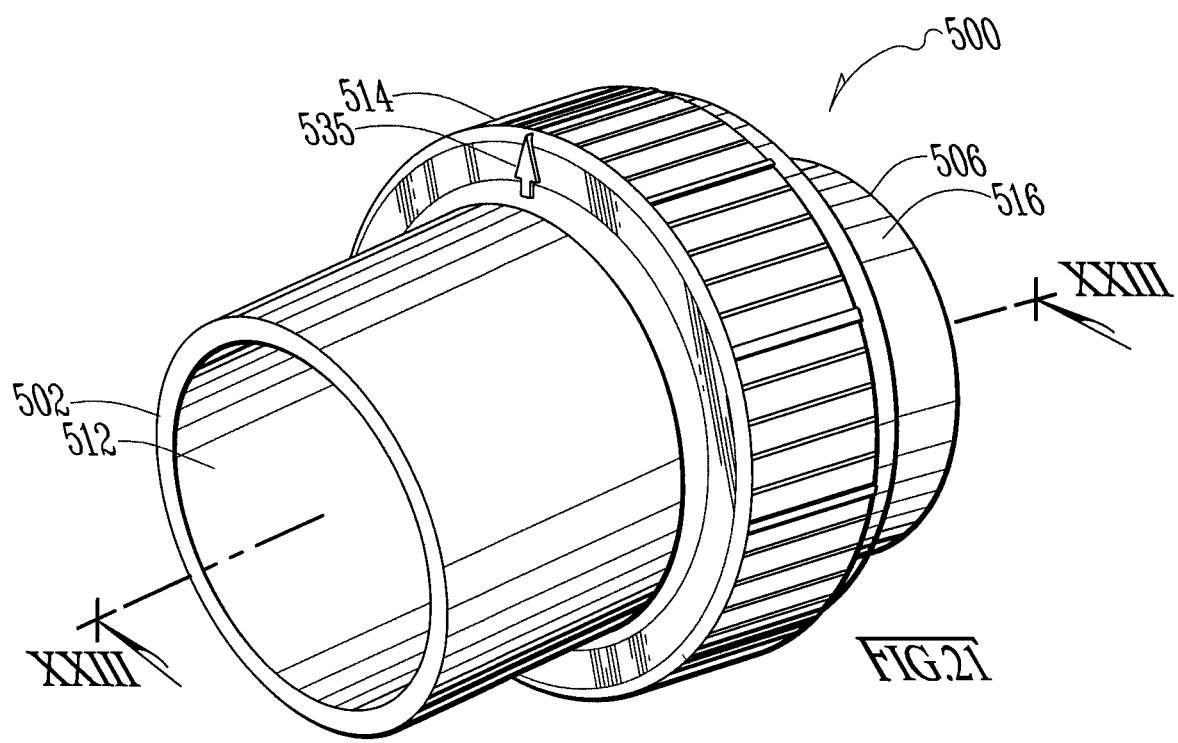
FIG. 21 is an enlarged-scale perspective view of the coupling from FIG. 20, except in isolation, and with the male flange link in the foreground (eg., left in the view) and the female flange link in the background.
Figure 22:
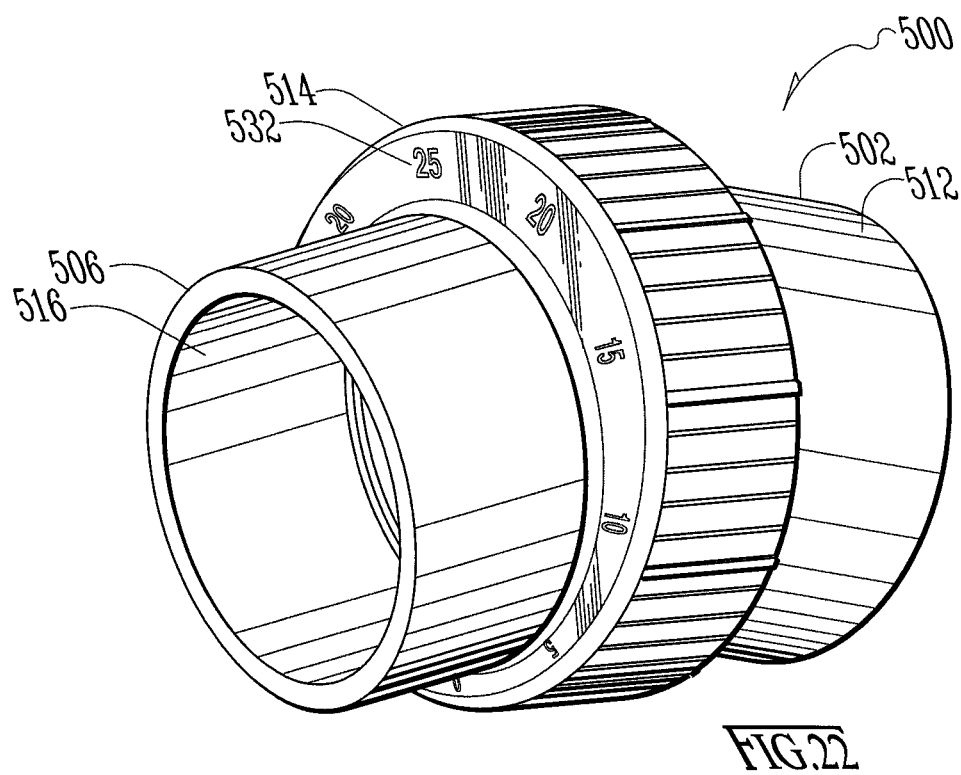
FIG. 22 is a perspective view comparable to FIG. 21 except with the coupling spun 180°.
Figure 24:
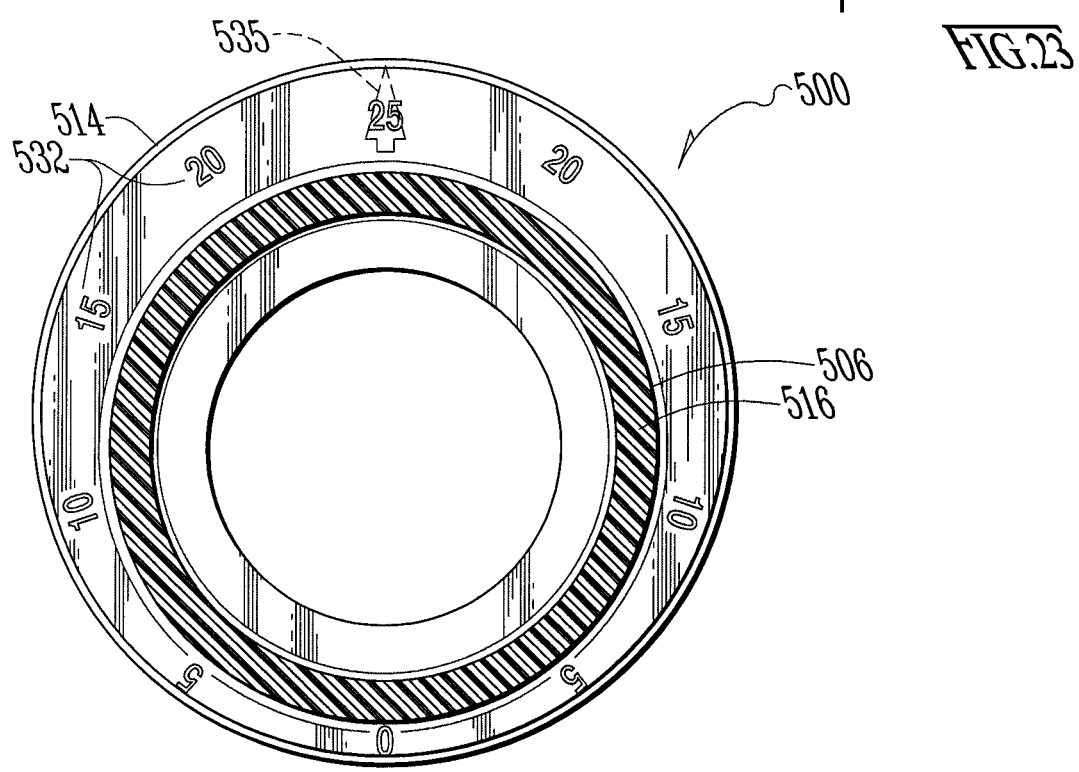
FIG. 24 is a section view taken in the direction of arrows XXIV-XXIV in FIG. 23.

FIG. 22 shows that one of the links 506 or 502 (it being the male flange link 506 in this instance, but without limitation) is provided with a convenient scale 532 to show adjustment between the extremes of a 0° (zero degree) angle and a 25° (twenty-five degree) angle. FIG. 21 shows that the other link 502 (or 506) is provided with an indicator 535 to match up with the scale 532. A worker would spin the links 502 and 506 relative to each other as shown in FIG. 24 to get the indicator 535 to match up with a reading on the scale of a 25° (twenty-five degree) angle. Alternatively, a worker would spin the links 502 and 506 relative to each other as shown in FIG. 26 to get the indicator 535 to match up with a reading on the scale of a 0° (zero degree) angle.

Given the foregoing, an adjustable coupling in accordance with the invention for conduits preferably comprises:

a tubular first link, a tubular second link, and a collar;

the first tubular link having a body extending between a fitting extension portion and an offset portion;

said fitting extension portion of the first link defining an axially-elongated lumen characterized by a linear central axis (462);

said offset portion of the first link defining a lumen therefor characterized by a respective linear central axis (472);

wherein said body of said first link is formed such that the respective lumens of the fitting extension portion therefor and the offset portion therefor join and provide a through passage through the first link;

the second tubular link having a body extending between a fitting extension portion and an offset portion;

said fitting extension portion of the second link defining a respective axially-elongated lumen therefor characterized by a linear central axis (466);

said offset portion of the second link defining a lumen therefor characterized by a respective linear central axis (476);

wherein said body of said second link is formed such that the respective lumens of the fitting extension portion therefor and the offset portion therefor join and provide a through passage through the second link;

the offset portion of the first link being configured to form a first flange surface perpendicular to the central axis for the offset portion of said first link;

the offset portion of the second link being configured to form a second flange surface perpendicular to the central axis for the offset portion of said second link; and said collar being configured to join the offset portion of the first link to the offset portion of the second link with the first and second flange surfaces mated together;

wherein the first flange surface and second flange surface can be angularly adjusted relative to each other such that the central axis (462) of the first link's fitting extension portion and the central axis (466) of the second link's fitting extension portion can be moved through a range of relative angles; and wherein when the first flange surface and the second flange surface are angularly adjusted relative to each other such that the central axis (462) of the first link's fitting extension portion and the central axis (466) of the second link's fitting extension portion are parallel to each other (FIG. 25A), then either:— the central axis (462) of the first link's fitting extension portion if projected would extend through the lumen of the second link's offset portion and the lumen of the second link's fitting extension portion; or the central axis (466) of the second link's fitting extension portion if projected would extend through the lumen of the first link's offset portion and the lumen of the first link's fitting extension portion.

The coupling could further comprise a welding solvent, wherein the first link, the second link and the collar are produced of synthetic, solvent-weldable materials whereby the joining of the first and second links together and furthermore the clamping thereof together is achieved and maintained by application of the solvent; or else a bonding agent, wherein the first link, the second link and the collar are produced of plastic materials whereby the joining of the first and second links together and furthermore the clamping thereof together is achieved and maintained by application of the solvent.

The second link and collar might optionally be conjoined together in a monolithic unitary body; with said collar defining a tubular interior sidewall; and with said offset portion of said first link having an axially-elongated outer sidewall for a close-fitting sliding telescopic fit inside the collar's tubular interior sidewall.

It is an aspect of the preferred design that when the first flange surface and the second flange surface are angularly adjusted relative to each other such that the central axis (462) of the first link's fitting extension portion and the central axis (466) of the second link's fitting extension portion are parallel to each other (FIG. 25A), both:— the central axis (462) of the first link's fitting extension portion if projected would extend through the lumen of the second link's offset portion and the lumen of the second link's fitting extension portion; and the central axis (466) of the second link's fitting extension portion if projected would extend through the lumen of the first link's offset portion and the lumen of the first link's fitting extension portion.

The body of the first link as well as the first flange surface thereof, and, the body of the second link as well as the second flange surface thereof, might optionally be configured such that the range of relative angles that can be adjusted between the central axis of the first link's fitting extension portion and the central axis of the second link's fitting extension portion ranges from where the respective axes of the respective fitting extension portions are parallel to where the respective axes subtend a greatest extreme off-axis angle.

The coupling might have the greatest extreme off-axis angle is at least 15° (fifteen degrees).

A preferred design has the collar defining a tubular interior sidewall; and said offset portion of said first link has an axially-elongated outer sidewall for a close-fitting sliding telescopic fit inside collar's tubular interior sidewall; wherein said collar defines a tubular interior sidewall is cylindrical, and, said first link's offset portion's axially-elongated outer sidewall is cylindrical whereby the range of angular adjustment between opposed extremes is variable across the range.

It is an option that the first link, the second link, and the collar are produced from plastic or solvent-weldable materials and clamping is achieved and maintained by application of a bonding agent or solvent.

In alternative phraseology, an adjustable coupling in accordance with the invention for conduits alternately preferably comprises:

a tubular first link, a tubular second link, and a collar;

the first tubular link having a body extending between a fitting extension portion and an offset portion;

said fitting extension portion of the first link defining an axially-elongated lumen characterized by an inner diameter ID_1 and a linear central axis (462);

said offset portion of the first link defining a lumen therefor characterized by a respective linear central axis (472) and intersecting the central axis (462) of said first link's fitting extension at a first corner contained in a first plane P_1 which is perpendicular to the central axis (462) of said first link's fitting extension portion;

wherein said body of said first link is formed such that the respective lumens of the fitting extension portion therefor and the offset portion therefor join and provide a through passage through the first link;

the second tubular link having a body extending between a fitting extension portion and an offset portion;

said fitting extension portion of the second link defining a respective axially-elongated lumen therefor characterized by an inner diameter ID_2 and a linear central axis (466);

said offset portion of the second link defining a lumen therefor characterized by a respective linear central axis (476) and intersecting the central axis (466) of said second link's fitting extension at a second corner contained in a second plane P_2 which is perpendicular to the central axis (466) of second link's fitting extension portion;

wherein said body of said second link is formed such that the respective lumens of the fitting extension portion therefor and the offset portion therefor join and provide a through passage through the second link;

the offset portion of the first link being configured to form a first flange surface perpendicular to the central axis for the offset portion of said first link;

the offset portion of the second link being configured to form a second flange surface perpendicular to the central axis for the offset portion of said second link; and said collar being configured to join the offset portion of the first link to the offset portion of the second link with the first and second flange surfaces mated together;

wherein the first flange surface and second flange surface can be angularly adjusted relative to each other such that the central axis (462) of the first link's fitting extension portion and the central axis (466) of the second link's fitting extension portion through a range of relative angles; and wherein when the first flange surface and the second flange surface are angularly adjusted relative to each other such that the central axis (462) of the first link's fitting extension portion and the central axis (466) of the second link's fitting extension portion are parallel to each other (ie., FIG. 25A), then:— the distance between plane P_1 and P_2 measured along a line parallel to both the central axis (462) of the first link's fitting extension portion and the central axis (466) of the second link's fitting extension portion defines transitional length TL corresponding to the separation between the lumen of said first link's fitting extension portion and the lumen of said second link's fitting extension portion;

and either:—

ID_1 is greater than TL; or

ID_2 is greater than TL.

Alternatively, ID_1 and ID_2 might optionally be greater than TL.

It is an optional aspect of the coupling that the body of the first link as well as the first flange surface thereof, and, the body of the second link as well as the second flange surface thereof, are configured such that the range of relative angles that can be adjusted between the central axis of the first link's fitting extension portion and the central axis of the second link's fitting extension portion ranges from where the respective axes of the respective fitting extension portions are parallel to where the respective axes subtend a greatest extreme off-axis angle. The greatest extreme off-axis angle might optionally be at least 15° (fifteen degrees).

FIGS. 27 through 31 show still yet another embodiment of an adjustable pipe coupling in accordance with the invention.

Figure 27:
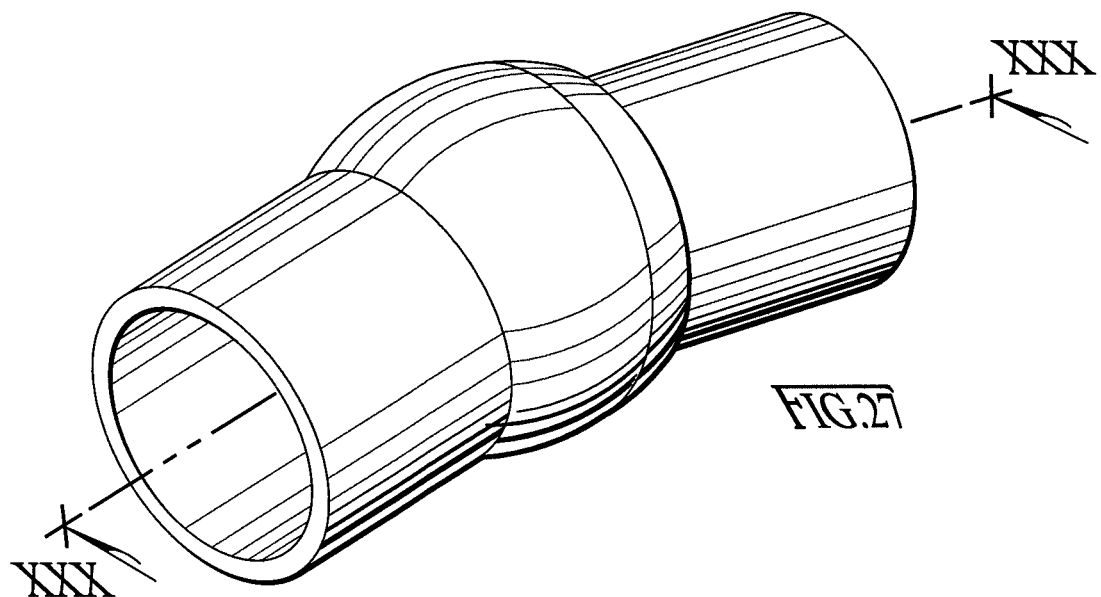
FIG. 27 (3) is a perspective view of still yet another embodiment of an adjustable pipe coupling in accordance with the invention, with a conjoined retainer ring in accordance with the invention, wherein the right-side part (eg., right in this view) is twisted (or swivelled) relative the left-side part to form a 157½° obtuse angle (ie., an 22½° acute angle) therebetween.
Figure 28:
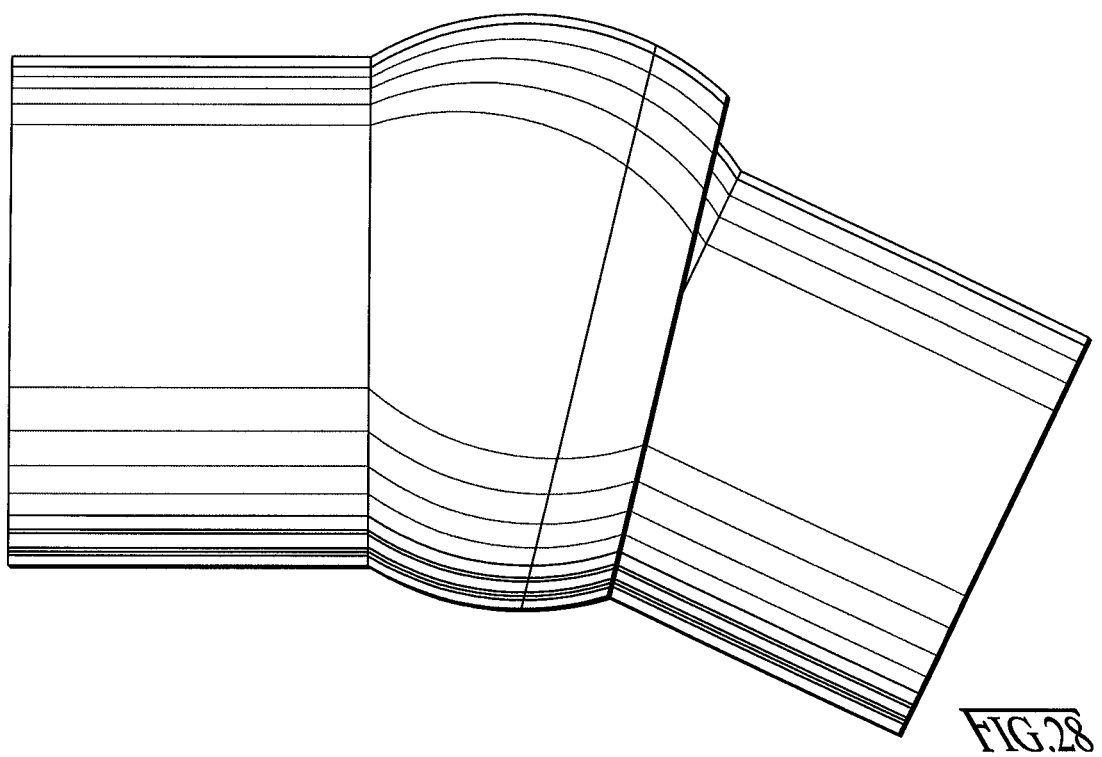
FIG. 28 (3) is an enlarged-scale side elevational view of FIG. 27.
Figure 29:
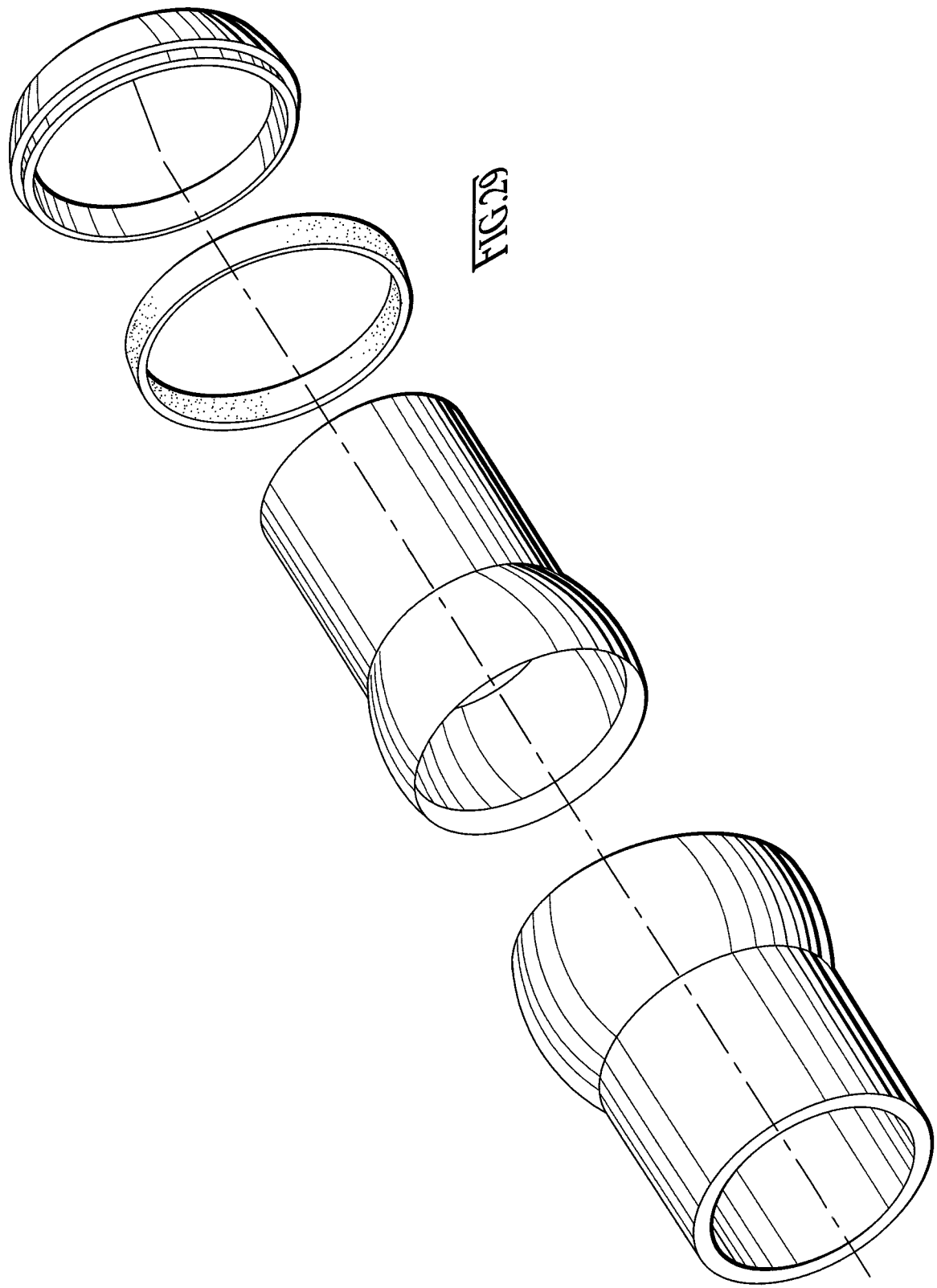
FIG. 29 is an exploded perspective view of the pipe coupling of FIGS. 27 and 28.
Figure 30:
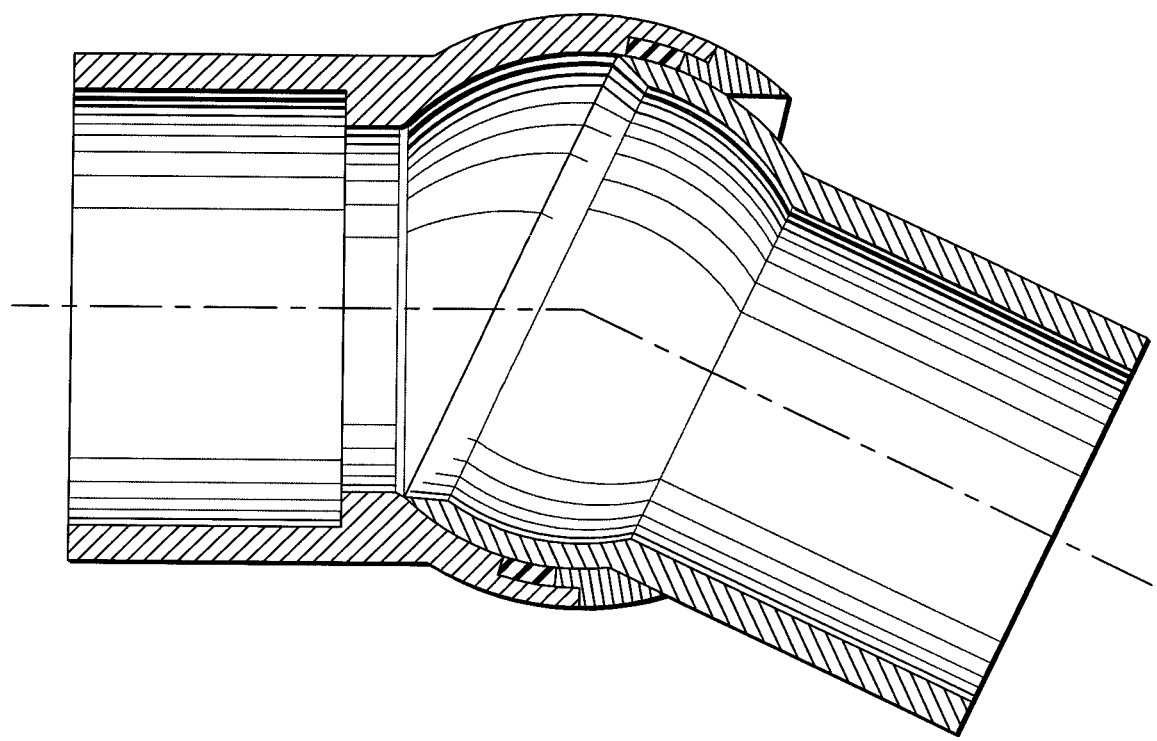
FIG. 30 (4) is a section view thereof taken through the line XXX-XXX in FIG. 27.
Figure 31:
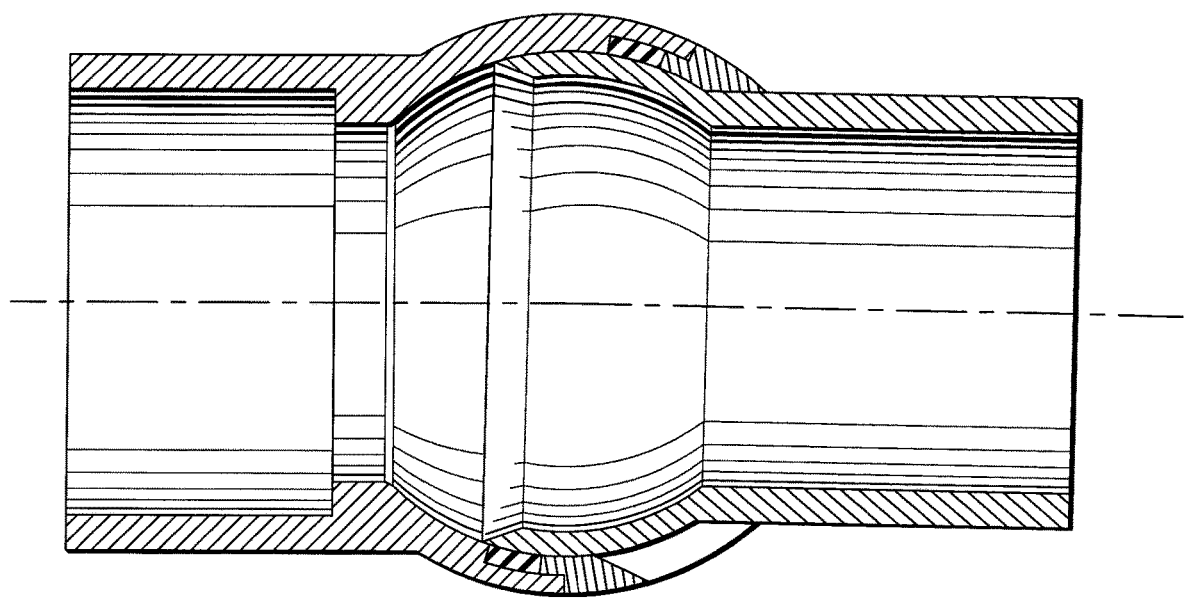
FIG. 31 (2) is a section view comparable to FIG. 30 except with the upper and lower parts twisted (or swivelled) relative to each other to form a 180° obtuse angle (ie., an 0° acute angle) therebetween.

More particularly, this embodiment shows a version of an adjustable pipe coupling more preferably here referred to as a twist coupling with a conjoined retainer ring in accordance with the invention, wherein the relatively larger part can be adjusted relative to the relatively smaller part to form between a 180° angle (ie., a straight angle, see FIG. 31), and, a 157½° obtuse angle (ie., an 22½° acute angle, and see FIGS. 27-28 and 30). In the drawings, the retainer ring is affixed to the butt edge of the bulb portion of the relatively larger part.

The coupling as shown by FIGS. 27 through 31 has a factory glued-in retainer ring (glued into position) to form an 11¼° (eleven and one-quarter degrees) bevel.

The relatively smaller part can be swivelled to negate the bevel, and hence the relatively larger and relatively smaller parts form a straight angle (ie., 180° angle). Alternatively, the relatively smaller part can be swivelled relative to the relatively larger part to double the 11¼° (eleven and one-quarter degrees) bevel such that the relatively smaller and relatively larger parts form 157½° obtuse angle (ie., an 22½° acute angle) therebetween.

An alternate version of the FIGS. 27 through 31 coupling has the factory glued-in retainer ring (glued into position) to form a perpendicular edge relative the axis of the relatively larger part, wherein the relatively smaller part can be swivelled to any 11¼° (eleven and one-quarter degrees) angle in all 360° (three hundred sixty degrees) of direction.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An adjustable coupling for conduits, comprising:
a tubular first link, a tubular second link, and a collar;
the first tubular link having a body extending between a fitting extension portion and an offset portion;
said fitting extension portion of the first link defining an axially-elongated lumen characterized by a linear central axis (462);
said offset portion of the first link defining a lumen therefor characterized by a respective linear central axis (472);
wherein said body of said first link is formed such that the respective lumens of the fitting extension portion therefor and the offset portion therefor join and provide a through passage through the first link;
the second tubular link having a body extending between a fitting extension portion and an offset portion;
said fitting extension portion of the second link defining a respective axially-elongated lumen therefor characterized by a linear central axis (466);
said offset portion of the second link defining a lumen therefor characterized by a respective linear central axis (476);
wherein said body of said second link is formed such that the respective lumens of the fitting extension portion therefor and the offset portion therefor join and provide a through passage through the second link;
the offset portion of the first link being configured to form a first flange surface perpendicular to the central axis for the offset portion of said first link;
the offset portion of the second link being configured to form a second flange surface perpendicular to the central axis for the offset portion of said second link; and
said collar being configured to join the offset portion of the first link to the offset portion of the second link with the first and second flange surfaces mated together;
wherein the first flange surface and second flange surface can be angularly adjusted relative to each other such that the central axis (462) of the first link's fitting extension portion and the central axis (466) of the second link's fitting extension portion can be moved through a range of relative angles; and
wherein when the first flange surface and the second flange surface are angularly adjusted relative to each other such that the central axis (462) of the first link's fitting extension portion and the central axis (466) of the second link's fitting extension portion are parallel to each other (FIG. 25A), then either:—
the central axis (462) of the first link's fitting extension portion if projected would extend through the lumen of the second link's offset portion and the lumen of the second link's fitting extension portion; or
the central axis (466) of the second link's fitting extension portion if projected would extend through the lumen of the first link's offset portion and the lumen of the first link's fitting extension portion.

2. The coupling of claim 1 further comprising:
a welding solvent, wherein the first link, the second link and the collar are produced of synthetic, solvent-weldable materials whereby the joining of the first and second links together and furthermore the clamping thereof together is achieved and maintained by application of the solvent.

3. The coupling of claim 1 further comprising:
a bonding agent, wherein the first link, the second link and the collar are produced of plastic materials whereby the joining of the first and second links together and furthermore the clamping thereof together is achieved and maintained by application of the solvent.

4. The coupling of claim 1 wherein:
the second link and collar are conjoined together in a monolithic unitary body;
said collar defining a tubular interior sidewall; and
said offset portion of said first link having an axially-elongated outer sidewall for a close-fitting sliding telescopic fit inside the collar's tubular interior sidewall.

5. The coupling of claim 1 wherein:
wherein when the first flange surface and the second flange surface are angularly adjusted relative to each other such that the central axis (462) of the first link's fitting extension portion and the central axis (466) of the second link's fitting extension portion are parallel to each other (FIG. 25A), both:— the central axis (462) of the first link's fitting extension portion if projected would extend through the lumen of the second link's offset portion and the lumen of the second link's fitting extension portion; and the central axis (466) of the second link's fitting extension portion if projected would extend through the lumen of the first link's offset portion and the lumen of the first link's fitting extension portion.

6. The coupling of claim 5 wherein:

said collar defines a tubular interior sidewall; and said offset portion of said first link has an axially-elongated outer sidewall for a close-fitting sliding telescopic fit inside collar's tubular interior sidewall;

wherein said collar defines a tubular interior sidewall is cylindrical, and, said first link's offset portion's axially-elongated outer sidewall is cylindrical whereby the range of angular adjustment between opposed extremes is variable across the range.

7. The coupling of claim 6 wherein:

the first link, the second link, and the collar are produced from plastic or solvent-weldable materials and clamping is achieved and maintained by application of a bonding agent or solvent.

8. The coupling of claim 1 wherein:

the body of the first link as well as the first flange surface thereof, and, the body of the second link as well as the second flange surface thereof, are configured such that the range of relative angles that can be adjusted between the central axis of the first link's fitting extension portion and the central axis of the second link's fitting extension portion ranges from where the respective axes of the respective fitting extension portions are parallel to where the respective axes subtend a greatest extreme off-axis angle.

9. The coupling of claim 8 wherein:

the greatest extreme off-axis angle is at least 15° (fifteen degrees).

\* \* \* \* \*